United States Patent
Kudo et al.

(10) Patent No.: US 6,560,692 B1
(45) Date of Patent: May 6, 2003

(54) DATA PROCESSING CIRCUIT, MICROCOMPUTER, AND ELECTRONIC EQUIPMENT

(75) Inventors: Makoto Kudo; Satoshi Kubota; Yoshiyuki Miyayama; Hisao Sato, all of Suwa (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 08/859,490

(22) Filed: May 20, 1997

(30) Foreign Application Priority Data

May 22, 1996 (JP) ............................................. 8-127541
May 8, 1997 (JP) ............................................. 9-135923

(51) Int. Cl.⁷ ............................................. G06F 15/00
(52) U.S. Cl. ..................... 712/23; 712/202; 712/210; 712/225; 711/121; 711/138; 711/145
(58) Field of Search ................. 395/800.01, 800.3, 395/800.23, 800.41; 711/111, 121, 138, 141, 145; 712/1, 23, 202, 41, 210, 225, 228

(56) References Cited

U.S. PATENT DOCUMENTS

| | | | |
|---|---|---|---|
| 3,701,976 A | * 10/1972 | Shively | 708/209 |
| 4,016,545 A | *  4/1977 | Lipovski | 711/100 |
| 4,236,206 A |   11/1980 | Strecker et al. | |
| 4,831,517 A | *  5/1989 | Crouse et al. | |
| 5,142,635 A | *  8/1992 | Avtar | 395/566 |
| 5,274,792 A | * 12/1993 | Sato | 395/425 |
| 5,283,874 A | *  2/1994 | Hammond | 712/206 |
| 5,361,392 A | * 11/1994 | Fourcroy et al. | 713/310 |
| 5,377,337 A | * 12/1994 | Antognini et al. | 709/100 |
| 5,386,560 A | *  1/1995 | McCauley et al. | 711/165 |
| 5,421,029 A |    5/1995 | Yoshida | |
| 5,446,879 A | *  8/1995 | Yamamoto et al. | 714/1 |
| 5,511,192 A | *  4/1996 | Shirakihara | 709/106 |
| 5,659,703 A | *  8/1997 | Moore et al. | 395/436 |
| 5,687,336 A | * 11/1997 | Shen et al. | 395/378 |
| 5,717,946 A | *  2/1998 | Satou et al. | 395/378 |
| 5,802,373 A | *  9/1998 | Yates et al. | 395/705 |
| 5,809,543 A | *  9/1998 | Byers et al. | 711/162 |
| 6,026,485 A | *  2/2000 | O'Connor et al. | 712/226 |
| 6,094,716 A | *  7/2000 | Witt | 712/23 |
| 6,151,662 A | * 11/2000 | Christie et al. | 711/145 |

FOREIGN PATENT DOCUMENTS

EP        2 637 708 A1    4/1990
WO    WO 96 087 67 A2    3/1996

OTHER PUBLICATIONS

M68000 8–/16–/32–Bit Microprocessors Programmer's Reference Manual by Motorola (Fifth Edition).*
Pentium Processor Family Developer's Manual Intel Corporation 1995.*
Introduction to MS–DOS with Examples, Eng., Hwang Hee Yook, Apr. 10, 1992.*
M68000 8–/16–/32–Bit Microprocessors Programmers's Reference Manual by Motorola (Fifth Edition).*

* cited by examiner

*Primary Examiner*—Mark Zimmerman
*Assistant Examiner*—Mackly Monestime
(74) *Attorney, Agent, or Firm*—Oliff & Berridge, PLC

(57) ABSTRACT

The data processing circuit of this invention enables efficient description and execution of processes that act upon the stack pointer, using short instructions. It also enables efficient description of processes that save and restore the contents of registers, increasing the speed of processing of interrupts and subroutine calls and returns. A CPU that uses this data processing circuit comprises a dedicated stack pointer register SP and uses an instruction decoder to decode a group of dedicated stack pointer instructions that specify the SP as an implicit operand. This group of dedicated stack pointer instructions are implemented in hardware by using general-purpose registers, the PC, the SP, an address adder, an ALU, a PC incrementer, internal buses, internal signal lines, and external buses. This group of dedicated stack pointer instructions comprises SP-relative load instructions, stack pointer move instructions, a call instruction, a ret instruction, a sequential push instruction, and a sequential pop instruction.

15 Claims, 24 Drawing Sheets

Note 1: Stack region used by the main program
Note 2: Auto-variable region used by the subroutine

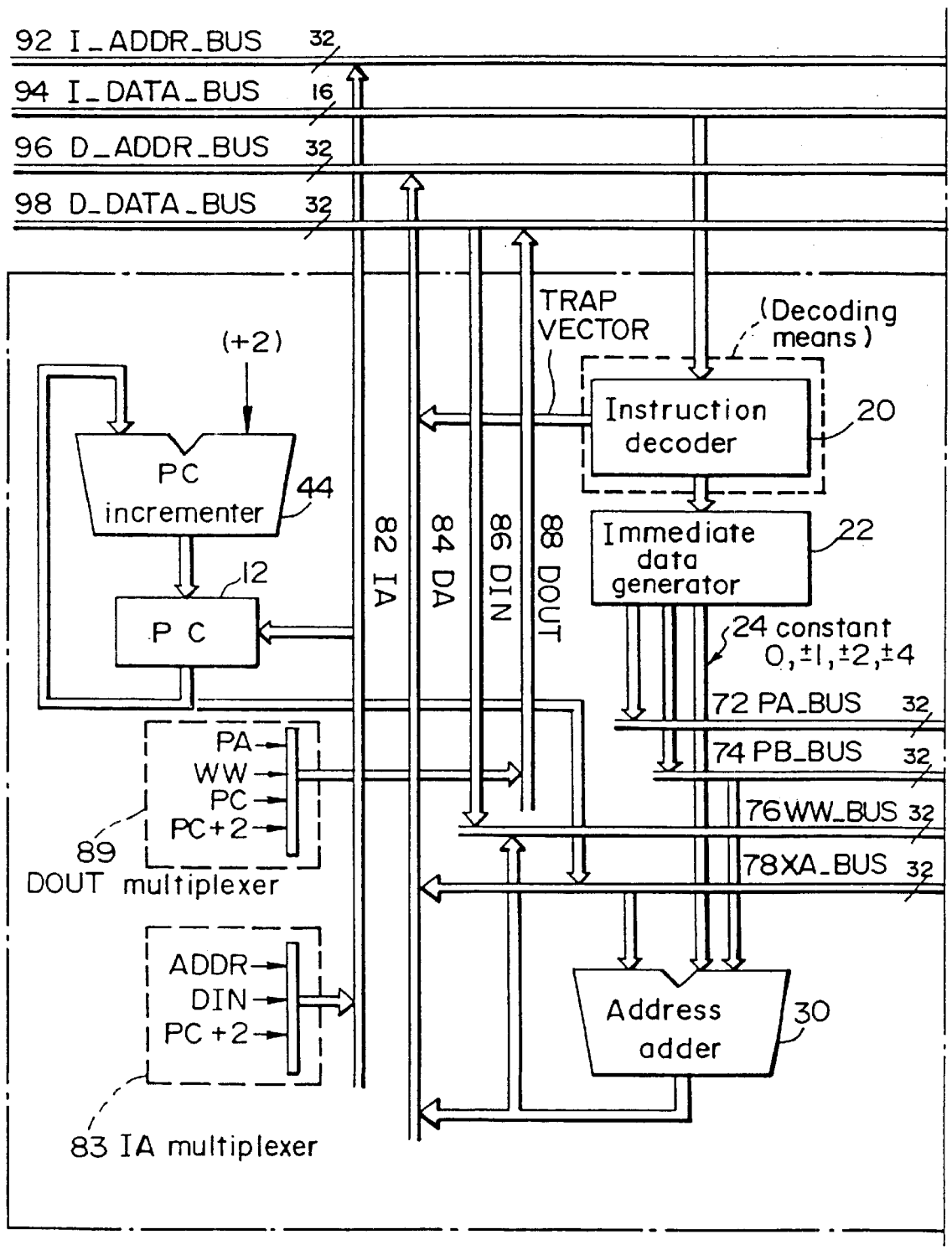

SP-relative load instruction

General-purpose load instruction

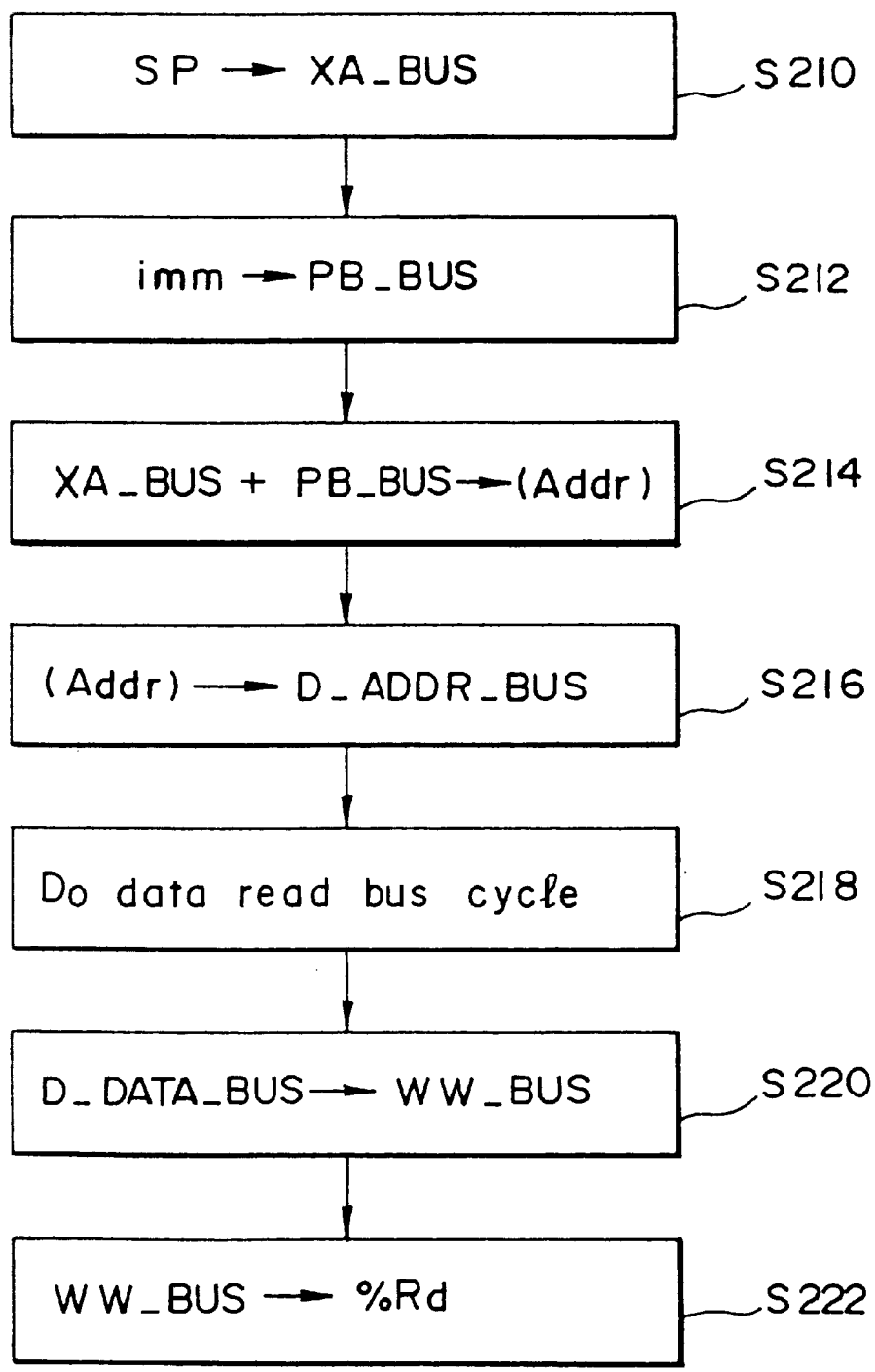

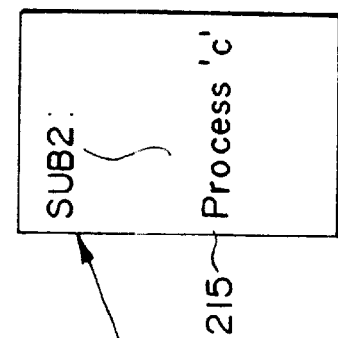
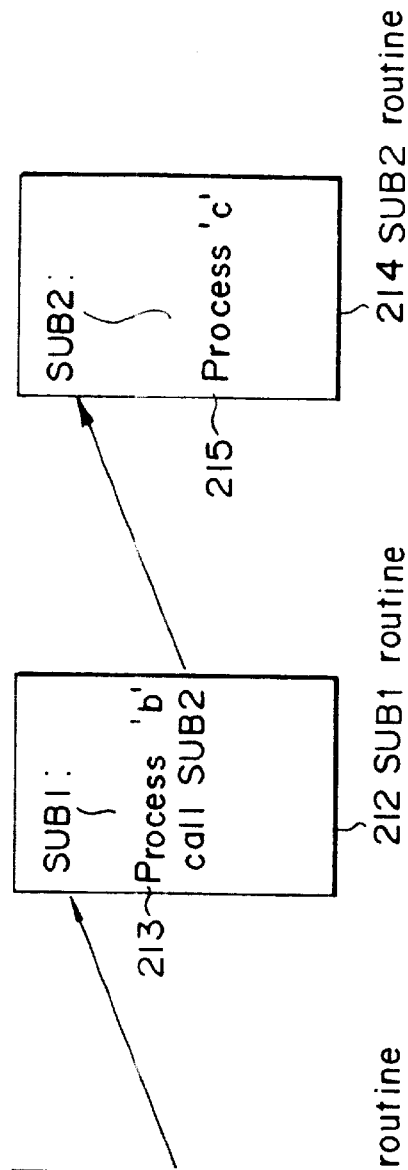
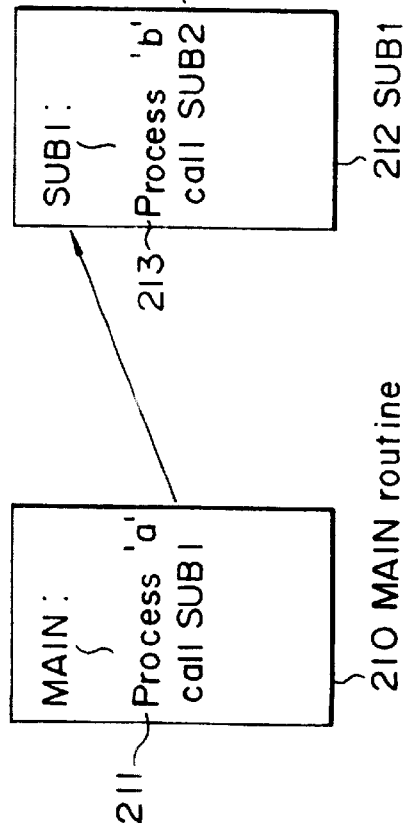
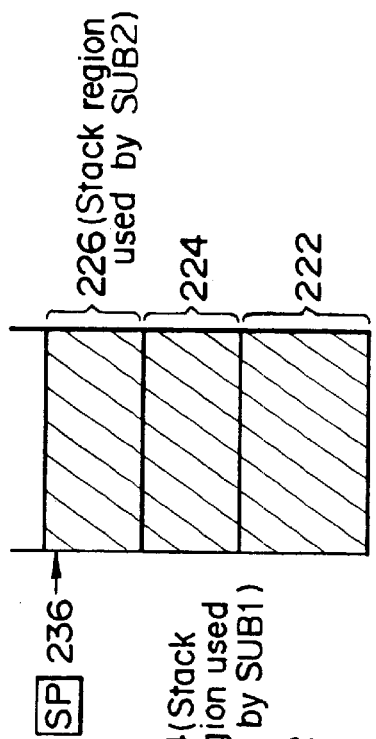
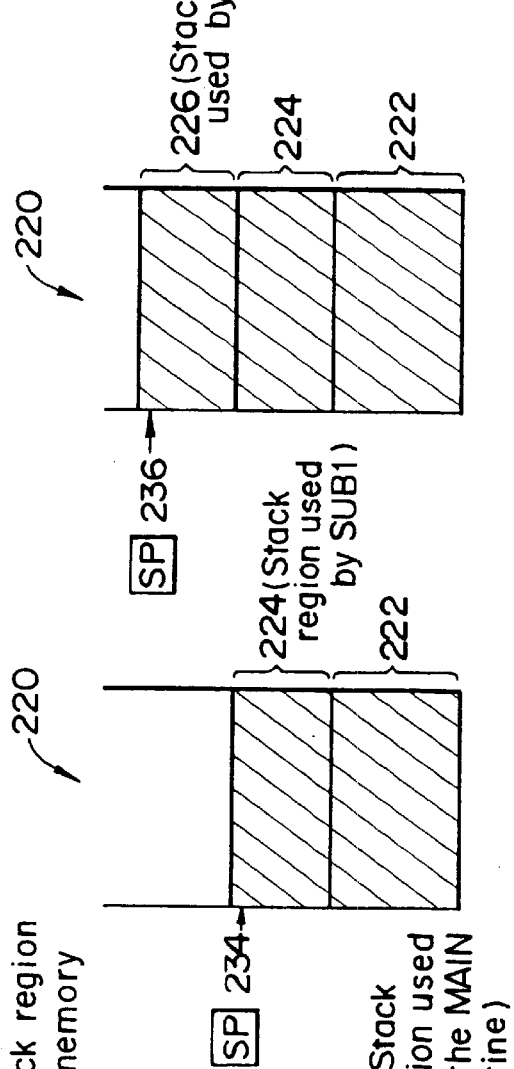
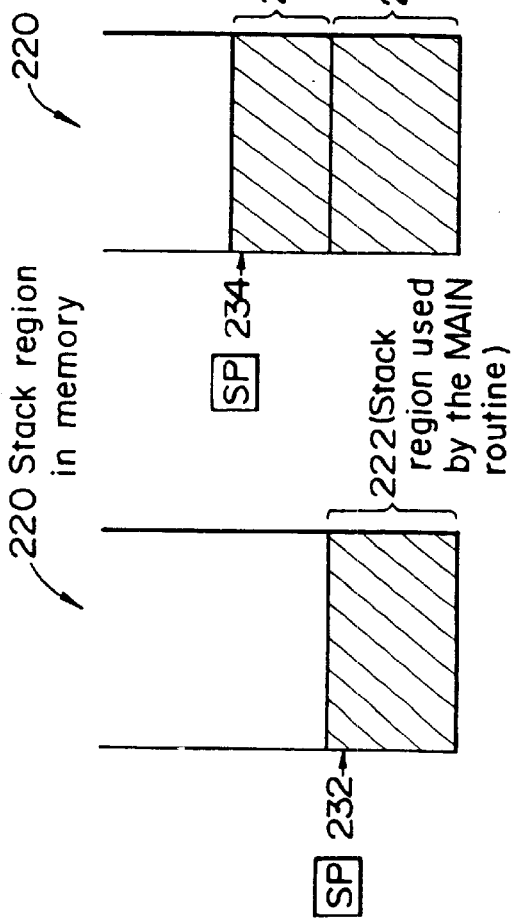

Stack pointer move instruction

General immediate data arithmetic instruction

Branch instruction

Execution of push R1

Execution of push R2

Execution of pop R2

Execution of pop R1 pushn and popn instructions

| Instruction | op |
|---|---|
| pushn | 0 0 |
| popn | 0 1 |

Flowchart of pushn execution

Flowchart of pop execution

DATA PROCESSING CIRCUIT, MICROCOMPUTER, AND ELECTRONIC EQUIPMENT

BACKGROUND OF THE INVENTION

1. Field of the Invention

This invention relates to a data processing circuit, a microcomputer incorporating this data processing circuit, and electronic equipment that is constructed by using this microcomputer.

2. Description of Related Art

In the prior art, a RISC microcomputer that is capable of manipulating 32-bit data uses fixed-length instructions that are 32 bits wide. This is because the use of fixed-length instructions enables a reduction in the time required for decoding the instructions in comparison with the use of variable-length instructions, and it also makes it possible to reduce the size of the circuitry of the microcomputer.

However, even with a 32-bit microcomputer, it isn't always necessary to use the full 32 bits. Thus, if all of the instructions are written as 32-bit instructions, many of them will contain unused portions so that memory will be used inefficiently.

The present inventors have investigated the idea of a microcomputer that handles fixed-length instructions of a bit width that is narrower than that of the executable data, to improve the usage efficiency without making the control circuitry more complicated.

However, simply cutting 32-bit fixed-length instructions to fit into a fixed 16-bit length, for example, causes problems as described below.

An important feature of a RISC microcomputer is the use of general-purpose registers, whose contents have no pre-assigned meaning. For that reason, when a stack pointer is used, one of the general-purpose register is used as the stack pointer and an instruction that acts upon a general-purpose register is used to implement stack operation.

When coding a process that takes data specified by a memory address obtained by adding a predetermined offset to the stack pointer and transfers it to a predetermined register, using an instruction that acts upon a general-purpose register, for example, it is necessary to include within the object code of that instruction the offset, data specifying the predetermined register, and data specifying the register to be used as the stack pointer.

Thus, if an instruction that acts upon a general-purpose register is used when coding a process that acts upon the stack pointer, a large amount of data has to be specified in the object code, making it difficult to code the details of the instruction within a 16-bit fixed-length. Increasing the instruction length to 32 bits, for example, would result in a large number of instructions that do not particularly need the entire 32 bits, so that many instructions will contain unused portions, leading to a decrease in the efficiency with which memory is used.

In addition, increasing the instruction length will also increase the amount of memory required for storing such instructions, so it is preferable from the point of view of efficient use of memory to not only use fixed-length instructions, but also make the instructions as short as possible.

When a program is executed that was written in a language that secures a storage region for auto-variables linked to the stack pointer, such as programming language C, there are many instructions that act upon the stack pointer, so it is preferable to have efficient coding and execution of instructions that act upon the stack pointer.

In that case, it is therefore preferable to have an architecture that enables the coding and execution of instructions that are as short as possible, when executing a process that acts upon the stack pointer.

It has become common recently to incorporate general-purpose registers internally, particularly with a RISC CPU, to increase capabilities. Providing a large number of registers internally makes it possible for many processes to be executed rapidly within the CPU itself, without having to access memory. If such a large number of internal registers is provided, a large number of registers have to be saved during the process of register save and restoration when an interrupt is processed or a subroutine is called.

The description now turns to a prior-art example of instructions that save and restore the contents of registers, frequently used when entering and leaving a subroutine, even within stack-related instructions.

The instruction set of a microcomputer usually has instructions for saving and restoring the contents of registers in the CPU to and from a stack provided in memory. These are either dedicated instructions or instructions that address registers indirectly.

In the Intel 80386 chip, push, pusha, and pushad instructions are available for writing the contents of registers to the stack, and pop, popa, and popad instructions are available for returning data from the stack to registers.

When the contents of a register are written to the stack by the push instruction, the register has to be specified as an operand, such as 'push EAX.' This example concerns a 32-bit register EAX. If the contents of registers EAX, ECX, EDX, and EBX are all to be written to the stack, this push instruction must be repeated, as follows:

push EAX
push ECX
push EDX
push EBX

If such push and pop instructions are used for each of the registers, the size of the object code increases and a large number of program execution steps is required, leading to delays in the execution time or processing of the program.

That is why the pusha or pushad instruction is used to write the contents of all eight of the general-purpose registers of the 80386 to the stack. pusha operates on the lower 16 bits of each of the eight registers, and pushad operates on the entire 32 bits. The use of pusha and pushad can remove the need to repeat the push instruction eight times.

The pop, popa, and popad instructions act in a similar manner.

Disadvantages of repeating the push instruction include the increased length of program code and the delays in execution caused by executing a fetch for each instruction.

From this point of view, the pusha and pushad instructions provide a large improvement when writing the contents of all eight registers to the stack. However, this is not an advantage when writing fewer than the eight registers, such as four or six registers.

In other words, if the pusha, pushad, popa, and popad instructions of the 80386 operate upon all of the registers, instructions with delayed cycle lengths must be used when there is no need to save and restore the contents of all of the registers. In such a case, one instruction will suffice, but this gives rise to a problem in that the execution cycle of that instruction takes too long.

Similar saving and restoration of the program counter is necessary when program flow branches to a subroutine and returns from the called routine, using instructions such as the call instruction and ret instruction. With a RISC CPU of the prior art, these processes are implemented by software. In other words, the program counter is saved and restored by executing assembler instructions (object code) that declare these processes. This leads to an increase in object code of the call and ret instructions, and the execution of a fetch for each instruction makes the execution speed sluggish.

SUMMARY OF THE INVENTION

An objective of this invention is to provide a data processing circuit, microcomputer, and electronic equipment having an architecture that enables efficient coding of processes that act upon the stack pointer within a short instruction length, for execution.

Another objective of this invention is to provide a data processing circuit, microcomputer, and electronic equipment that enables efficient coding of processes that save and restore the contents of registers, with fast processing of interrupts and subroutine calls and returns.

In order to achieve the above objectives, a first aspect of this invention provides a data processing circuit comprising:

a dedicated stack pointer register that is used only for the stack pointer;

decoding means for decoding object code of a group of dedicated stack pointer instructions which have object code specifying the dedicated stack pointer register as an implicit operand and which relate to processing based on the dedicated stack pointer register, and for outputting a control signal based on the object code; and execution means for executing the group of dedicated stack pointer instructions based on the control signal and the contents of the dedicated stack pointer register.

In this document, "object code" generally refers to program code obtained as a result of translation into machine language by a translation program. With reference to the present invention, it is used in a broad sense to comprise all program coda written in machine language, irrespective of whether this is done by a translation program.

The data processing circuit of this invention is configured that a group of dedicated stack pointer instructions having a dedicated stack pointer register that is used only for the stack pointer and acting upon the dedicated stack pointer register are decoded and executed.

Since this group of dedicated stack pointer instructions has dedicated op code that specifies manipulation of the dedicated stack pointer register, it is not necessary to specify the stack pointer in the operands of the object code. That is to say, this group of dedicated stack pointer instructions uses the dedicated stack pointer register as an implicit operand. This makes it possible to write shorter instructions for manipulating the stack pointer, in comparison with an stack pointer manipulation in which one of the general-purpose registers is allocated to the stack pointer and instructions that act upon that general-purpose register are used.

The present invention therefore makes it possible to provide a data processing circuit that is capable of coding and executing shorter instructions for processes that act upon the stack pointer. It also enables the provision of a data processing circuit that makes efficient use of the memory.

In a second aspect of this invention, the group of dedicated stack pointer instructions comprises a load instruction having data for specifying a transfer register within object code;

the decoding means decodes the load instruction; and the execution means performs at least one of a transfer of data from a given first area in memory to a given first register and a transfer of data from the given first register to the given first area, based on a memory address specified by the dedicated stack pointer register and a register address specified by the data for specifying a transfer register, when the load instruction is executed.

In this case, the load instruction comprised within the group of dedicated stack pointer instructions is an instruction for transferring data between memory and a register, which means at least one of a transfer from memory to the register and a transfer from the register to memory. Note that this concept also comprises address data, irrespective of the contents of the data. A memory address is an address for specifying an area in memory during data transfer.

Since this load instruction has dedicated op code that specifies an operation relating to the dedicated stack pointer register, it is not necessary to have data specifying the stack pointer in the operands of the object code. It is therefore possible to code within a short instruction length when performing transfers of data between a register and an area in memory having a memory address linked to the stack pointer.

In a third aspect of this invention, the load instruction comprises offset data within the object code that is data relating to an offset for specifying the address of the first area in the memory; and the execution means determines the memory address according to the contents of the dedicated stack pointer register and the offset data.

In this case, offset data could be an offset that is specified directly as immediate data, or it could be specified indirectly by means such as specifying the address of a register or the like containing the offset. When this load instruction comprising offset data is executed, the memory address necessary for the data transfer is determined on the basis of the contents of the dedicated stack pointer register and the offset data.

This means that instructions can be coded within a short length, for the transfer of data between a register and an area in memory having a memory address that is determined on the basis of the stack pointer and the offset data.

This invention makes it possible to specify any area in the stack, by specifying appropriate offset data, even with a data processing circuit that is configured in such a manner that the stack pointer always indicates a word boundary. Thus the data can be stored in the stack efficiently according to size, enabling an increase in the usage efficiency of the stack.

In a fourth aspect of this invention, the offset data comprises immediate offset data and data size information relating to the size of given data in memory; and the execution means creates an offset by performing a leftward logical shift on the immediate offset data, based on the immediate offset data and the data size information, and determines the memory address by adding the offset to the contents of the dedicated stack pointer register.

In this case, the immediate offset data is an offset that is specified directly by immediate data. The data size information is the size of data in memory to be transferred.

The data size is usually represented as $2^n$ (where n is greater than 3), such as 8-bit byte data, 16-bit half-word data, or 32-bit word data. Addresses in memory are given in byte units, so that half-word data is placed at half-word boundaries and word data is placed at word boundaries. This means that the least significant bit of the memory address of half-word data is 0 and the least significant two bits of the memory address of word data are 00. Since the address of the stack pointer indicates a word boundary, the least significant bit of the offset is 0 when creating a memory address for half-word data and the least significant two bits of the offset are 00 when creating a memory address for word data.

A leftward logical shift means moving the bit string of the data to the left, and inserting zeros into the bits on the right-hand end of the data that are made vacant by the shift (shift-in bits).

This aspect of the invention makes it possible to code immediate offset data without the lower bits that are determined unambiguously by the data size, because the immediate offset data is shifted to the left in accordance with the data size. This means that the immediate offset data can be specified efficiently, and larger offsets can be specified than in cases in which the data size is specified as is, even if the data size is not bytes.

The use of these instructions makes it possible to select boundary locations that are matched to the size of data when that data is written to memory or read therefrom.

In a fifth aspect of this invention, the group of dedicated stack pointer instructions comprises a stack pointer move instruction for having move data within the object code thereof and for moving the stack pointer;

the decoding means decodes the stack pointer move instruction; and the execution means modifies the contents of the dedicated stack pointer register based on the move data when the stack pointer move instruction is executed.

Since this stack pointer move instruction has dedicated op code that specifies manipulation of the dedicated stack pointer register, data for specifying the stack pointer in the operands of the object code is not necessary. This makes it possible to code within a short instruction length, when it is desired to move the stack. Thus the amount of instruction coding can be reduced for processes involving data stored in the stack and data that is stored linked to the stack pointer.

Since this aspect of the invention makes it possible to move the stack in a simple manner, it is particularly effective for processes that secure different stack areas for different individual routines. In other words, addresses can be specified over a wide region by moving the stack pointer for each routine, as appropriate.

In a sixth aspect of this invention, the move data comprises immediate data for the stuck pointer move instruction; and the instruction execution means performs at least one of a process of adding the immediate data for the stuck pointer move instruction and the contents of the dedicated stack pointer register and a process of subtracting the immediate data for the stuck pointer move instruction from the contents of the dedicated stack pointer register.

This aspect of the invention makes it possible to code shorter instruction length for processes that move the stack pointer upward or downward by an amount specified by the immediate data for the stuck pointer move instruction.

In a seventh aspect of this invention, the data processing circuit further comprises:

a plurality of registers provided in a contiguous sequence;

wherein the group of dedicated stack pointer instructions comprises at least one of a sequential push instruction and a sequential pop instruction having data for specifying a plurality of registers in the object code thereof;

the decoding means decodes at least one of the sequential push instruction and the sequential pop instruction; and the instruction execution means performs at least one of a process of executing a plurality of sequential pushes of data from the plurality of registers to a stack provided in memory and a process of executing a plurality of sequential pops of data from the stack to the plurality of registers, based on the contents of a memory address specified by the dedicated stack pointer register and the data for specifying a plurality of registers, during the execution of at least one of the sequential push instruction and the sequential pop instruction.

A push means the storage of data at the top of a stack provided in memory, and a pop means the fetching of data from this stack. In this case, each of the push processing and pop processing comprises this process of storing or fetching data and the corresponding updating of the stack pointer. An ordinary data processing circuit has a push instruction for storing data or an address from one register to the stack, and a pop instruction for fetching the contents of the stack to a register. Each push and pop instruction transfers data between the register and the stack and updates the stack pointer in correspondence with this transferring.

This means that is it necessary to execute these instructions repeatedly when transferring data between a plurality of registers and the stack.

However, the execution of the sequential push instruction or sequential pop instruction of this aspect of the invention provides the same effect as executing a plurality of push instructions or a plurality of pop instructions in sequence. In other words, it is possible to execute a single instruction to move data between a plurality of registers and the stack, and also update the stack pointer correspondingly. This makes it possible to avoid the increase in size of the object code caused by repeated execution of the push or pop instruction, when transferring data between a plurality of registers and the stack. This also enables an increase in the speed of processing interrupts and subroutine calls and returns, without increasing the number of execution steps in the program and without any wasted cycles.

The data processing circuit of an eighth aspect of this invention further comprises:

n general-purpose registers specified by register numbers 0 to n−1;

wherein object code of at least one of the sequential push instruction and the sequential pop instruction comprises a final register number to which one of the register numbers is specified, as the data for specifying a plurality of registers; and the execution means performs at least one of a process of executing a plurality of sequential pushes of data into a stack provided in memory from a plurality of registers starting from register o to a register specified by the final register number and a process of executing a plurality of sequential pops of data from the stack to a plurality of registers starting from register 0 to a register specified by the final register number, based on the contents of a memory address specified by the dedicated stack pointer register.

When there are plurality of general-purpose registers, there are usually addresses for specifying these registers. This invention specifies these registers by register number, in continuous sequence from 0 to n−1.

This aspect of the invention makes it possible to execute at least one of a push or pop of data between memory and a plurality of continuous registers from register 0 to the register with a final register number, by specifying any register number as the final register number. Therefore, the contents of registers can be saved and restored efficiently during the execution of a program having a structure that uses registers in sequence from register number 0.

In a ninth aspect of this invention, the execution means comprises:

write means for writing the contents of a given register that is one of the plurality of registers to a stack provided in memory, based on a memory address specified by the dedicated stack pointer register;

number-of-times-written count means for counting the number-of-times-written of the write means; and comparison means for comparing the number-of-times-written counted by the count means with the value of the data for specifying a plurality of registers;

wherein the write means comprises:

write memory address generation means for adding a first input and a second input by an adder, and for generating a write memory address for specifying a write destination;

first input control means for providing control such that the first input of the adder is the contents of the dedicated stack pointer register at the start of execution of a sequential dedicated instruction, and is a write address generated subsequently by a write address generation means;

second input control means for outputting an offset used during the writing of one word from the stack to the second input of the adder; and write means for writing to the stack the contents of a register specified by subtraction processing which uses the data for specifying a plurality of registers and the number-of-times-written, based on the write memory address;

whereby the writing of the contents of the plurality of registers to the stack and the ending of the writing are controlled based on the comparison result of the comparison means.

In a tenth aspect of this invention, the instruction execution means comprises:

read means for reading the contents of a stack provided in memory based on a memory address specified by the dedicated stack pointer register, and storing the contents in a given register of the plurality of registers;

number-of-times-read count means for counting the number-of-times-read of the read means; and comparison means for comparing the number-of-times-read counted by the count means with the value of the data for specifying a plurality of registers;

wherein the read means comprises:

write memory address generation means for adding a first input and a second input by an adder, and for generating a write memory address for specifying a write destination;

first input control means for providing control such that the first input of the adder is the contents of the dedicated stack pointer register at the start of execution of a sequential dedicated instruction, and is a read address generated subsequently by a read address generation means;

second input control means for outputting an offset used during the writing of one word from the stack to the second input of the adder;

read means for reading the contents of the stack based on the read memory address and storing the contents in a register specified based on the number-of-times-written;

whereby the reading of the contents of the stack and the ending of the reading are controlled based on the comparison result of the comparison means.

This configuration makes it possible to implement the saving to the stack of the contents of a plurality of registers specified by linked sequential values and the restoration of data to a plurality of registers specified by linked sequential values, using only a count means and a simple sequence controller. Since this makes it possible to provide a data processing circuit with a small number of gates, this invention can be applied to one-chip microcomputers or the like.

An eleventh aspect of this invention further comprises:

a program counter register used only for the program counter;

wherein the group of dedicated stack pointer instructions comprises branch instructions that are an instruction for branching to a subroutine and a return instruction from the subroutine;

the decoding means decodes the branch instructions;

the instruction execution means comprises:

means for executing at least one of a process of saving the contents of the program counter register to a given second area of the stack provided in memory and a process of restoring the contents of the second area to the program counter register, based on a memory address specified by the dedicated stack pointer register, during the execution of the branch instruction; and means for updating the contents of the dedicated stack pointer register based on the saving and restoration.

In this case, a subroutine could be such as an interrupt processing, exception processing, or debugging processing routine. Therefore, an instruction for branching to a subroutine could be such as an instruction that calls a subroutine or the like, or a software interrupt instruction or software debugging interrupt instruction for branching to an interrupt processing, exception processing, or debugging processing routine. Similarly, a return instruction from the subroutine could be a return instruction such as from an interrupt processing, exception processing, and debugging processing routine.

It is usually necessary to save and restore the program counter when branching to a subroutine or returning from a subroutine.

This invention makes it possible to save and restore the program counter simultaneously with the execution of the instruction for branching to the subroutine and the instruction for returning from the subroutine. In other words, the data processing circuit of this aspect of the invention has a circuit structure that enables the saving and restoration of the program counter by either one of instruction, within an instruction for branching to a subroutine and a return instruction from the subroutine. There is therefore no need for instructions for the saving and restoration of the program counter, which is necessary when branching to a subroutine and returning therefrom, enabling a reduction in the number of instructions. This makes it possible to increase the speed of processing during a branch to another routine, such as subroutine call and return, without wasting cycles.

When a software interrupt instruction is generated, for example, it is necessary to save and restore the processor status register that holds the current state of the CPU or other data processing circuit. It is therefore preferable to perform this saving and restoration of the processor status register simultaneously with the execution of an instruction such as a software interrupt instruction.

A twelfth aspect of this invention relates to a data processing circuit comprising a plurality of registers provided in a contiguous sequence and a stack pointer allocated to one of a plurality of general-purpose registers, the data processing circuit further comprise;

means for decoding object code of an instruction that is at least one of a sequential push instruction and sequential pop instruction that each have data for specifying a plurality of registers within object code and for outputting a control signal on the basis of the object code; and means for performing at least one of a process of executing a plurality of sequential pushes of data from the plurality of registers to a stack provided in memory and a process of executing a plurality of sequential pops of data from the stack to the plurality of registers, based on the control signal, the contents of a memory address specified by the dedicated stack pointer register, and the data for specifying a plurality of registers, during the execution of at least one of the sequential push instruction and the sequential pop instruction.

This aspect of the invention relates to a sequential push instruction and a sequential pop instruction that are used when a general-purpose register is used as the stack pointer.

The execution of this sequential push instruction or sequential pop instruction has the same effect as the execution of a plurality of push instructions in sequence or the execution of a plurality of pop instructions in sequence. In other words, the movement of data between a plurality of registers and the stack and the corresponding updating of the stack pointer are enabled by the execution of single instructions. This makes it possible to avoid the increase in object code size caused by repeated executions of push or pop instructions, when transferring data between a plurality of registers and the stack. This also enables an increase in the speed of processing interrupts and subroutine calls and returns, without increasing the number of execution steps in the program and without any wasted cycles In a thirteenth aspect of this invention, this data processing circuit uses instructions of a RISC.

A RISC data processing circuit is designed with the objectives of reducing the dimensions of the hardware and increasing the speed thereof. Thus, a RISC data circuit has many general-purpose registers. Reduction of the number of instructions is achieved by using only an instruction set which has universality.

Therefore, with a RISC data processing circuit, the stack pointer is allocated to a general-purpose register, and the processing uses an instruction set that acts upon this general-purpose register when manipulating the stack pointer. However, this method leads to an increased instruction length, so that memory is used inefficiently.

This aspect of the invention makes it possible to increase the efficiency with which memory is used by a RISC data processing circuit, by reducing the instruction length.

In the data processing circuit of a fourteenth aspect of this invention, a fixed-length instruction is decoded and execution is based on that instruction.

When the use of fixed-length instructions is compared with the use of variable-length instructions, it is possible to shorten time required for decoding the instructions and reduce the dimensions of the data processing circuit itself. To ensure that memory is used efficiently when fixed-length instructions are employed, by avoiding the creation of unused portions within instruction, it is preferable to have little variation in the number of bits necessary for each instruction, so that they are as short as possible.

This aspect of the invention makes it possible to reduce the length of instructions that act upon the stack pointer and thus tend to become too long. It is therefore possible to avoid the creation of unused portions within instructions, even when fixed-length instructions are employed, so that memory can be used more efficiently.

The microcomputer of a fifteenth aspect of this invention comprises the previously described data processing circuit of this invention, storage means, and input and output means for inputting data from and for outputting data to external devices.

This aspect of the invention makes it possible to provide a microcomputer with a fast processing speed and efficient usage of memory.

In the microcomputer of a sixteenth aspect of this invention, a program that is executed thereby uses a program language that secures a storage region for auto-variables by using the stack pointer.

An example of a language that secures a storage region for auto-variables by using the stack pointer is C language. When the microcomputer of this invention executes a program written in such a language, the processing speed and memory usage efficiency can be increased effectively.

Electronic equipment in accordance with a seventeenth aspect of this invention comprises one of the above described microcomputers of this invention.

This aspect of the invention makes it possible to provide inexpensive, but sophisticated, electronic equipment that is facilitated by a data processing circuit that has a fast processing speed and a highly efficient usage of memory.

BRIEF DESCRIPTION OF THE DRAWINGS

FIG. 7 is a flowchart illustrative of the operation during the SP-relative load instruction for reading word data;

FIGS. 9A to 9F show views illustrative of the usage state of the stack in memory and the state of the stack pointer during each routine of an executing program that extends over a plurality of routines;

DESCRIPTION OF PREFERRED EMBODIMENTS

Embodiments of this invention are described below with reference to the accompanying drawings.

Embodiment 1

(1) Configuration of the CPU of this Embodiment

The CPU of this embodiment executes virtually all of its instructions within one cycle, thanks to its pipeline and load/store architecture. All of the instructions are expressed as 16-bit fixed-length instructions, so that instructions processed by the CPU of this embodiment are implemented within compact object code.

In particular, this CPU is configured in such a manner that it has a dedicated stack pointer register to enable the efficient coding and execution of processes that act upon the stack pointer. It also enables the decoding and execution of an instruction set of a group of dedicated stack pointer instructions that have object code specifying that dedicated stack pointer register as an implicit operand.

Figure 1B:
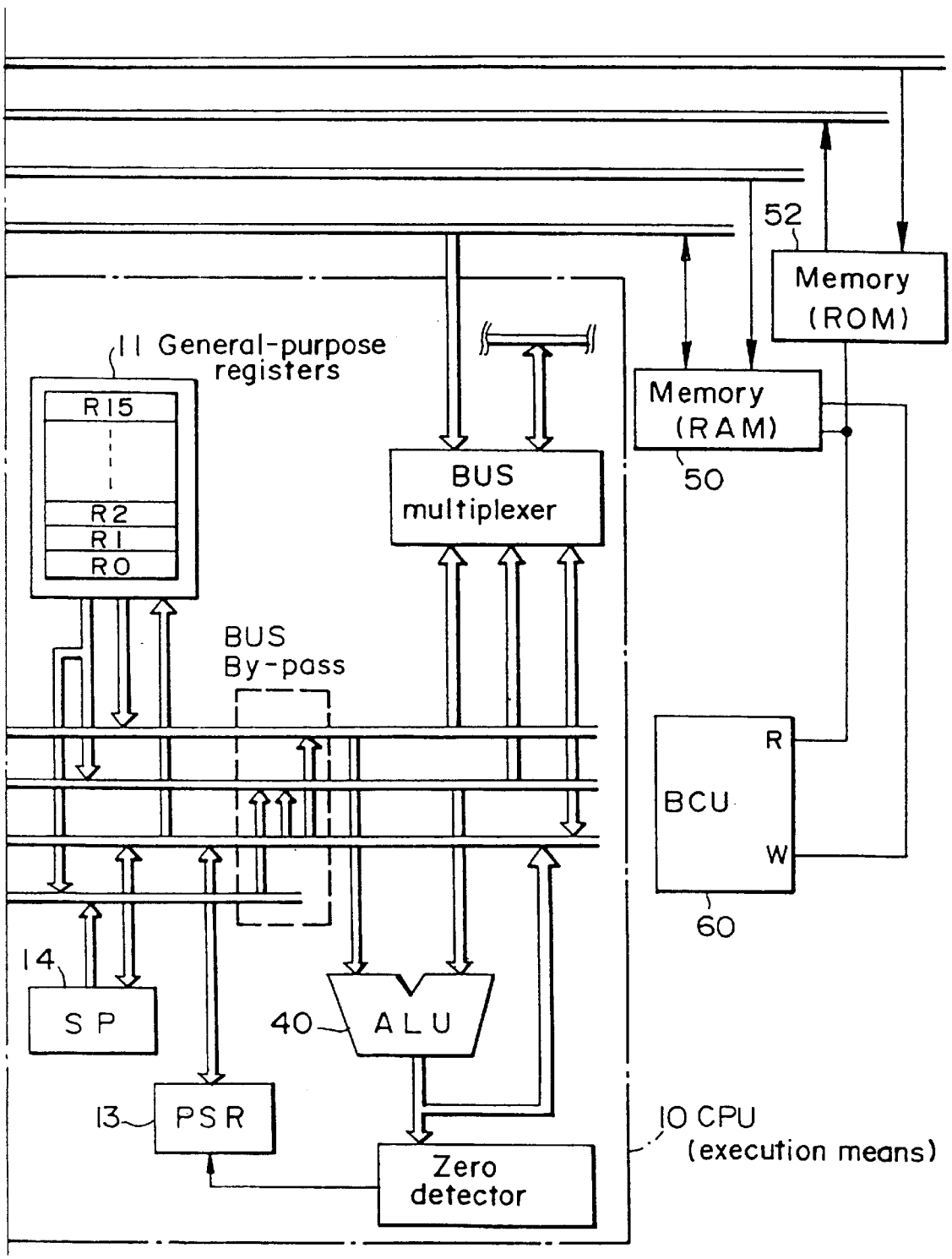
FIG. 1 is a schematic view of the circuit structure of a CPU in accordance with a first embodiment of this invention.

A schematic view of the circuit structure of the CPU of this embodiment is shown in FIG. 1 by way of illustration.

This CPU 10 comprises a register set that includes general-purpose registers 11, a PC register 12 for holding the program counter, PSR (processor status register) 13, and a dedicated stack pointer register SP 14; an instruction decoder 20; an immediate data generator 22; an address adder 30; an ALU 40; a PC incrementer 44; various internal buses 72, 74, 76, and 78; and various internal signal lines 82, 84, 86, and 88.

The instruction decoder 20 decodes object code that has been input, performs the processing necessary for the execution of the resultant instruction, and outputs any necessary control signals. Note that this instruction decoder 20 also functions as a decoding means for decoding the object code of the above mentioned dedicated stack pointer instruction and outputting control signals on the basis of that instruction.

The immediate data generator 22 generates 32-bit immediate data that will be used during execution, on the basis of immediate data comprised within the object code, and generates the 0, ±1, ±2, and ±4 constant data that is necessary for the execution of each instruction. The PC incrementer 44 updates the program counter stored in the PC 12, on the basis of the execution cycles of the instructions. The address adder 30 adds the data that is stored in the various registers and the immediate data generated by the immediate data generator 22 to generate the address data required during the reading of data from memory. The ALU 40 performs numerical calculations and logical operations.

This CPU also comprises internal bus and signal lines. The functions of a PA_BUS 72 and a PB_BUS 74 include the transfer of input signals for the ALU 40. The functions of a WW_BUS 76 include the fetching of calculation results from the ALU 40, to transfer them to the general-purpose registers. The functions of an XA_BUS 78 include the transfer of address data that has been fetched from the general-purpose registers 11 and the SP 14. An IA signal line 82 transfers address data from the various components within the CPU to an external I_ADDR_BUS 92. A DA signal line 84 transfers address data from the various components within the CPU to an external D_ADDR_BUS 96. A DIN signal line 86 transfers data from an external D_DATA_BUS 98 to the various components within the CPU. A DOUT signal line 88 transfers data from the various components within the CPU to the external D_DATA_BUS 98. An IA multiplexer 83 switches between signals that are to be output to the IA signal line 82 (signals on the PA_BUS 72, on the WW_BUS 76, from the PC 12, and a value that is the PC plus 2). A DOUT multiplexer 89 switches between signals that are to be output to the DOUT signal line 88 (signals on the PA_BUS 72, on the WW_BUS 76, from the PC 12, and the value that is the PC plus 2).

Since the components of the CPU 10 execute instructions on the basis of control signals that are output from the instruction decoder 20, they also function as means for executing a group of dedicated stack pointer instructions on the basis of the above described control signals and the contents of the dedicated stack pointer register.

This CPU 10 transfers signals to and from the exterior through a 16-bit instruction data bus (I_DATA_BUS) 94, an instruction address bus (IADDR_BUS) 92 for instruction data access, the 32-bit data bus (D_DATA_BUS) 98, the data address bus (D_ADDR_BUS) 96 for data access, and a control bus (not shown in the figure) for control signals.

(2) Register Set of the CPU of this Embodiment

Essential portions of the concept of the register set of the CPU of this embodiment will now be described.

Figure 2:
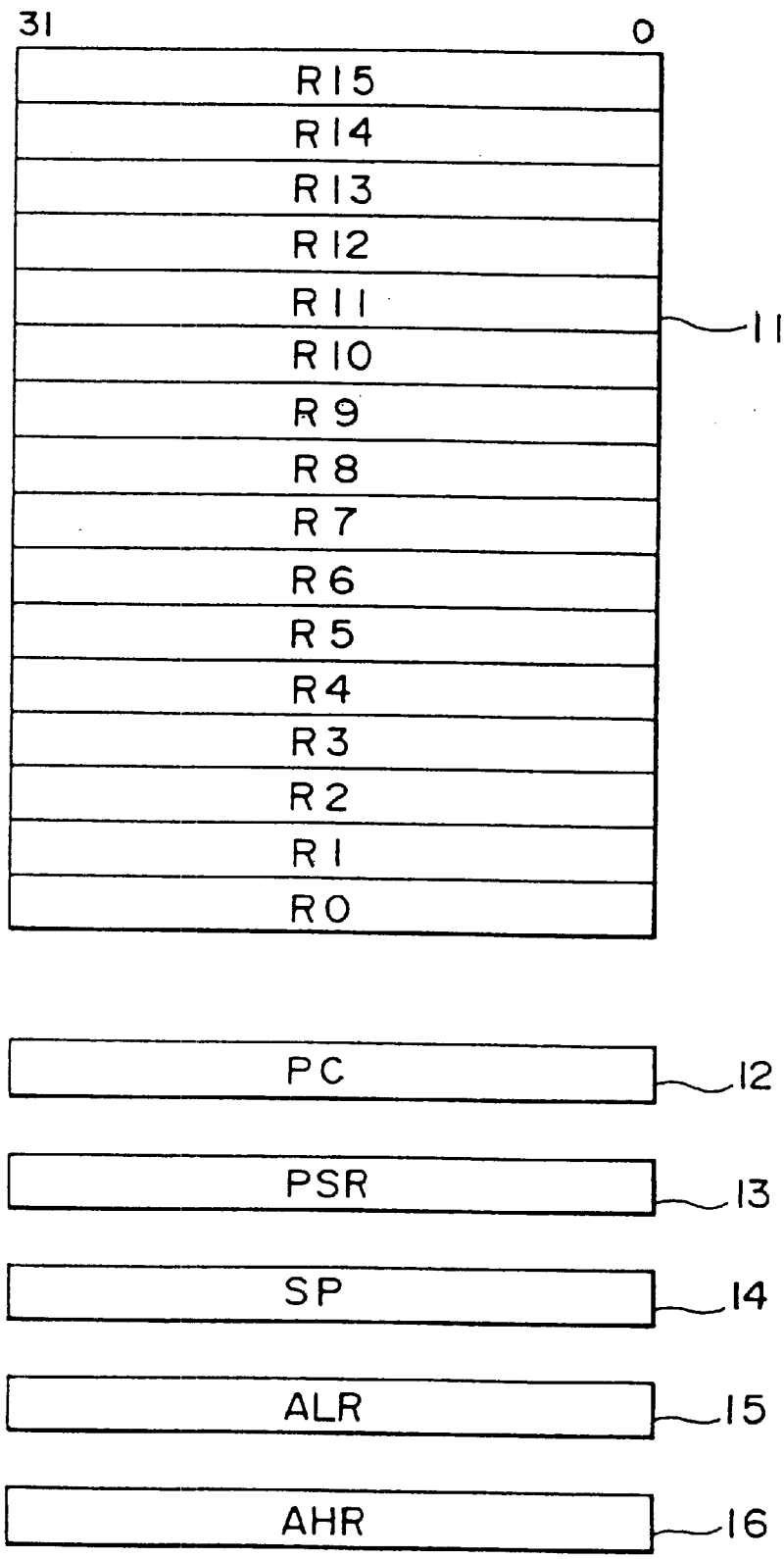
FIG. 2 shows a register set of the CPU of this embodiment.

The register set of the CPU of this embodiment is shown in FIG. 2. This CPU has a register set that comprises the 16 general-purpose registers 11, the PC 12, the PSR 13, the SP 14, ALR (arithmetic low register) 15, and AHR (arithmetic high register) 16.

The general-purpose registers 11 are functionally equivalent to 32-bit registers and are labeled R0 to R15. These general-purpose registers 11 are used during data calculations and address computations.

The PC 12 is a 32-bit-long incremental counter that holds a program counter indicating the address of the currently executing instruction. In this document, "PC" is used when referring to the register itself and "program counter" is used when referring to the value stored within the PC.

The PC 12 cannot be accessed directly by instructions such as the load instruction. With a call or int instruction, or when an interrupt or exception occurs, the program counter is read from the PC 12 and saved to the stack. In this manner, a jump destination address used when a branch instruction is executed can be set in the PC. This also happens for a branch specified by a conditional branch instruction. The instruction address for the return destination is read from the stack by a ret or reti instruction and is replaced in the PC 12.

PSR (processor status register) 13 is a 32-bit register to which a flag is allocated, and which holds the current status of the CPU. When an int instruction, an interrupt, an exception, or the like occurs, the state of the PSR at that point is saved to the stack when the flow branches to the corresponding processing routine. Conversely, the execution of the reti instruction causes the saved value to be replaced in the PSR.

The SP 14 is a 32-bit dedicated stack pointer register containing the stack pointer that indicates the higher address of the stack. In this document, SP is used when referring to the register itself and stack pointer is used when referring to the value stored within the SP. Note, however, that since the stack pointer always points to a word boundary, the lowermost two bits of the stack pointer are always zero.

This stack pointer is updated at the generation of a trap or at the execution of one of a group of dedicated stack pointer instructions that are provided by this embodiment.

Examples of these dedicated stack pointer instructions that update the stack pointer include instructions that branch to another routine, such as the call and ret instructions, a stack pointer move instruction, a pushn instruction, and a popn instruction. For instance, when the call instruction is executed, the stack pointer is first decremented by an amount equivalent to the word size (−4), then the PC 12 is saved to the stack. Conversely, when the ret instruction is executed, the destination address for return is loaded into the PC from the stack, and the stack pointer is incremented by an amount equivalent to the word size (+4). When an int instruction is executed, or when an interrupt or exception occurs, the value in the PC or PSR is saved to the stack by the following procedure:

1. SP=SP−4
2. The PC is saved at the higher address of the stack, indicated by the stack pointer.
3. SP=SP−4
4. The PSR is saved at the higher address of the stack, indicated by the stack pointer.

When the reti instruction is executed, the above process is reversed to restore the CPU to its original state. Thus the execution of the call, ret, or int instruction causes the stack pointer to be updated as appropriate for that execution. Details of each instruction will be given later.

A trap function provided by this embodiment comprises interrupts that are generated asynchronously with the execution of instructions and exceptions generated by the execution of instructions. When a trap is generated, the CPU saves PC (program counter) and PSR (process status register) to the stack, then reads a vector table from a trap table and branches to a routine corresponding to that trap. Concomitant with the generation of the trap, IE (interrupt enable) bit is cleared and the generation of subsequent maskable interrupts is inhibited. Maskable external interrupts are enabled again by using a load instruction with respect to the PSR to write 1 to the IE bit.

The reti instruction is used to return from the trap processing routine to the original routine. When the reti instruction is executed, the CPU reads the PSR and PC from the stack in that order, restores the PSR to its original value and also branches to the return address. Note that exceptions include debugging exceptions, address misalignment exceptions, overflow exceptions, and zero-division exceptions.

Detailed descriptions of ALR (arithmetic low register) 15 and ALH (arithmetic high register) 16 are omitted.

The special registers PSR 13, SP 14, ALR 15, and AHR 16 of the CPU are capable of transferring data to and from the general-purpose registers, using load instruction. Each register has a special register number and is accessed by using that number.

| Special Register Name | Special Register Number | Assembler Mnemonic |
| --- | --- | --- |
| Process status register | 0 | % PSR |
| SP | 1 | % SP |
| Arithmetic low register | 2 | % ALR |
| Arithmetic high register | 3 | % AHR |

(3) Description of Stack and Stack Pointer

The stack is a temporary storage region provided in memory. It is a contiguous region in which data is written from the bottom up, as if stacked in a rack. The stack pointer indicates the address of the data at the top of the stack, that is, the data that was written most recently into the stack.

The basic operation of the stack pointer will now be described with reference to FIG. 3.

Figure 3:
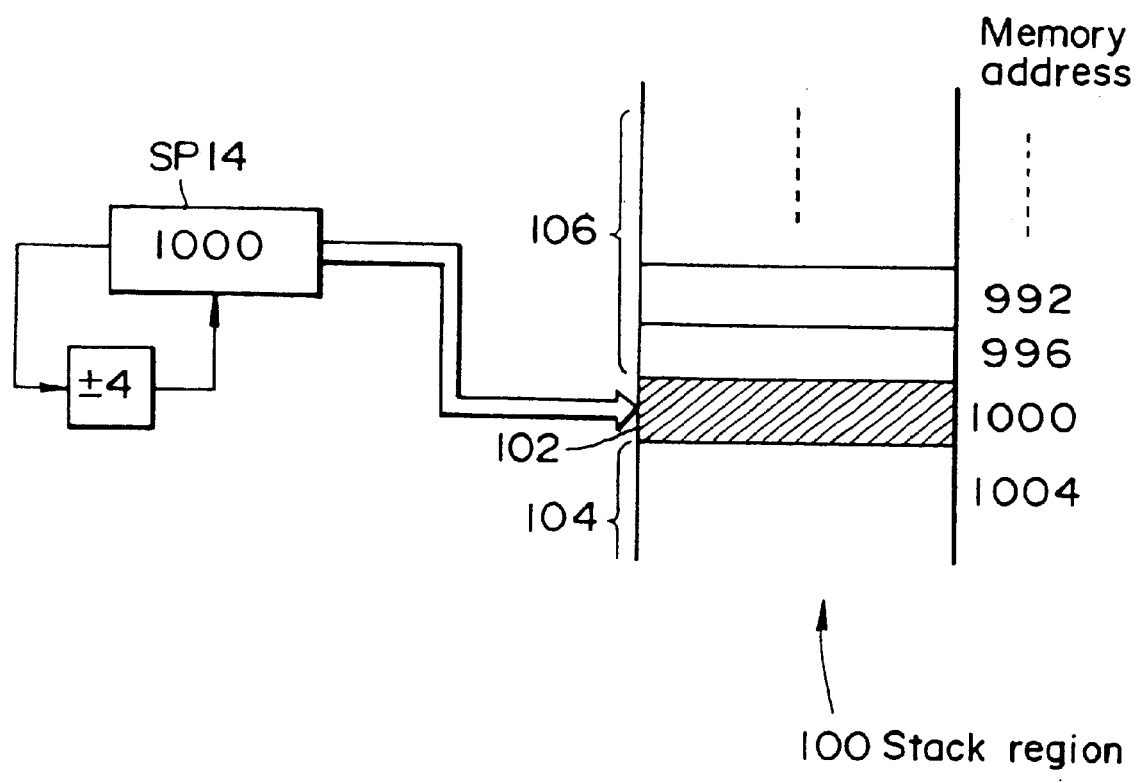
FIG. 3 is a view illustrative of the basic operation of the stack pointer.

Reference number 100 in FIG. 3 denotes a stack region provided in memory. A hatched portion 102 represents data that was most recently stored in this region, and a memory address 1000 indicates that data. Note that a region 104 below the hatched portion 102 contains data that has already been stored and a portion 106 above the hatched portion 102.is available for storing data in the future.

The stack pointer always indicates a word boundary. This means that, when data is written to the stack, the stack pointer within the SP 14 moves upward by 4 and the data is stored at the location indicates by that stack pointer. When data stored in the stack is fetched, it is the data at the address indicated by the current SP 14 that is fetched and the stack pointer stored in the SP 14 moves downward by 4. In this manner, the stack pointer always indicates the storage address of the data that was stored most recently in the stack.

(4) Description of Group of Dedicated Stack Pointer instructions

A RISC CPU always uses a general-purpose register as the stack pointer. This embodiment has the SP 14, which is a dedicated stack pointer register, which is operated upon by the previously mentioned group of dedicated stack pointer instructions.

This group of dedicated stack pointer instructions is a generic name for a number of instructions that access the SP 14 as an implicit operand and perform operations on the SP 14. The group of dedicated stack pointer instructions comprises instructions that branch to other routines, such as SP-relative load instructions (ld, etc.), stack pointer move instructions (add, sub), instructions for branching to subroutines (call, etc.), and return instructions (ret, etc.); a sequential push instruction (pushn); and a sequential pop instruction (popn).

What these instructions have in common is that they are dedicated stack pointer instructions so there is no need for data specifying the stack pointer in the object code. Another common feature is that they enable the efficient coding in short instructions of processes that use the stack pointer.

The use of these instructions makes it possible to efficiently process data that is stored in a stack provided in memory. Interrupt and subroutine call/return processes can also be performed efficiently.

Figure 4:
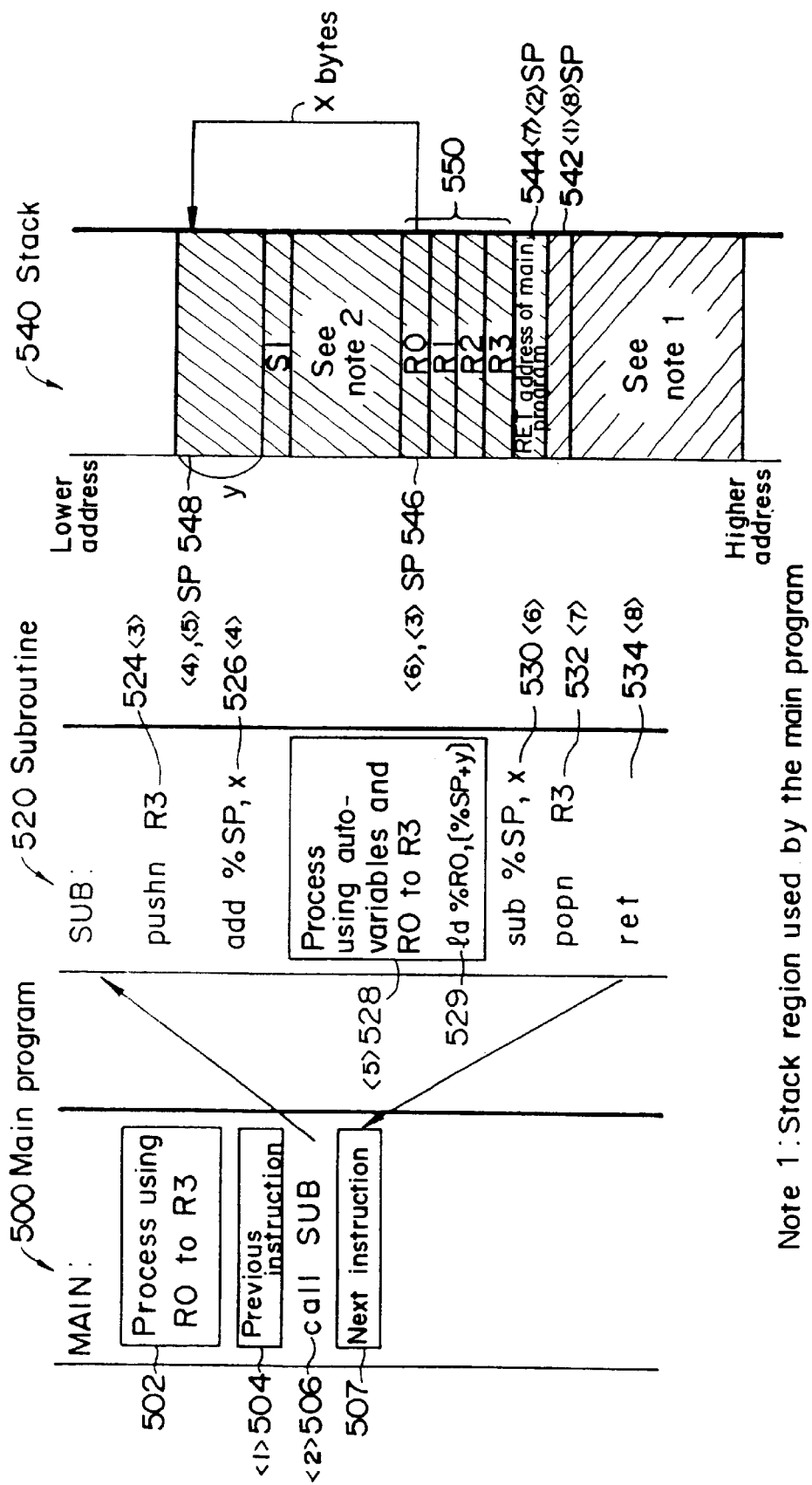
FIG. 4 shows an example of the usage of a dedicated stack pointer instruction, as well as the usage state of the stack provided in memory and the state of the stack pointer.

An example of the usage of these dedicated stack pointer instructions when a subroutine is called will now be described with reference to FIG. 4. This figure also shows the usage state of the stack provided in memory and the state of the stack pointer. A MAIN program 500 and a subroutine 520 of FIG. 4 are written as object code created by a C compiler. Reference number 540 denotes the state of a stack in memory. Reference number 502 indicates that processing is being performed, using the general-purpose registers R0 to R3. Reference number 506 denotes a subroutine call instruction. Before the subroutine call instruction is executed by the MAIN program 500, in other words, after the previous instruction indicated by 504 has been executed, the stack pointer (SP) points to an address <1> in the stack in memory. When this subroutine call instruction is executed, control passes to the subroutine 520. At this point, an instruction for branching to a subroutine (call instruction), which is one of the dedicated stack pointer instructions of this embodiment, is executed.

When this instruction is executed, the value of the stack pointer (SP) is automatically incremented by −4 (at <2> in FIG. 4) and the address for return to the MAIN program is stored in an area 544 of the stack that is indicated by the stack pointer <2>.

When the subroutine 520 starts executing, it first transfers the values that are stored in the general-purpose registers R0 to R3 used by the MAIN program. Reference number 524 denotes a sequential push instruction (pushn) which is one of the dedicated stack pointer instructions that saves the values stored in the general-purpose registers R0 to R3 to the stack. When this instruction is executed, the values stored in the general-purpose registers R0 to R3 are transferred in sequence to the stack, so that they are stored in the stack 540 as shown at 550 in FIG. 4. When the execution of this process ends (524 <3>), the stack pointer (SP) is at 546 (<3>SP).

The subroutine 520 then secures an auto-variable region to be used by the subroutine. An add instruction denoted by 526 is a stack pointer move instruction which is a dedicated stack pointer instruction that causes the stack pointer to move upward to secure a stack region to be used by the subroutine 520. When this instruction is executed, the stack pointer (SP) moves upward by X bytes to a location 548 (<4> SP) to secure an auto-variable region to be used by the subroutine, as stated in Note 2.

Reference number 528 denotes processing that uses auto-variables and the general-purpose registers R0 to R3 within the subroutine 520. At this point, the location of the stack pointer is as indicated by <5> and the loading of the auto-variables is performed by using a dedicated SP load instruction that is one of the dedicated stack pointer instructions.

Reference number 529 denotes this SP load instruction that transfers an auto-variable Si that is stored in memory to the general-purpose register R1. This auto-variable S1 is stored at a location that is offset by Y bytes from the stack pointer (<5> SP). The stack pointer does not move during the above processing of the subroutine 528, so the memory address of the auto-variable is specified by the stack pointer plus the offset. This makes it possible to use the dedicated SP load instruction to fetch data to and from the general-purpose registers efficiently.

Before control returns from the subroutine 520 to the MAIN program 500, the values in the general-purpose registers R0 to R3 that were saved to the stack must be restored to the general-purpose registers R0 to R3 and the slack pointer must be reset to indicate the area 544 that contains the address for return to the MAIN routine. This restores the stack pointer that was moved by the stack pointer move instruction of 526 back to its original location. A sub instruction indicated by 530 is a stack pointer move instruction which is a dedicated stack pointer instruction that moves the stack pointer downward. When this instruction is executed, the stack pointer moves to 546 (<6> SP). The data 550 stored in the stack is restored to the general-purpose registers R0 to R3. Reference number 532 denotes a sequential pop instruction (popn) which is a dedicated stack pointer instruction that transfers data in the stack to the general-purpose registers R0 to R3. When this instruction is executed, the values 550 stored in the stack are sequentially transferred to the general-purpose registers R0 to R3 so that they are stored in the stack 540 as shown at 550 in FIG. 4. When the execution of this process ends (532 <7>), the stack pointer indicates 544 (<7> SP).

Reference number 534 denotes a return instruction. When this return instruction is executed, control passes to the MAIN program. In this case, a return instruction (ret instruction) which is a dedicated stack pointer instruction is executed by this embodiment. When this instruction is executed, control branches to an instruction that indicates the address for return to the MAIN program, which is stored in the stack area indicated by <7> SP. In other words, the MAIN program 500 returns to the next instruction 507. The value of the stack pointer is automatically incremented by +4 to move it to the top area of the stack used by the MAIN program 500 (<8> SP in FIG. 4).

The description now turns to details of each of the dedicated stack pointer instructions, as well as the circuit structure required for executing these instructions and the operation during such execution.

(5) Stack Pointer (SP) Relative Load Instructions

A C compiler creates object code that specifies that an auto-variable region is to be linked to the stack pointer. More specifically, the C compiler acts as means for securing an auto-variable region that is Y bytes long, at an offset of X from the stack pointer.

Figure 5:
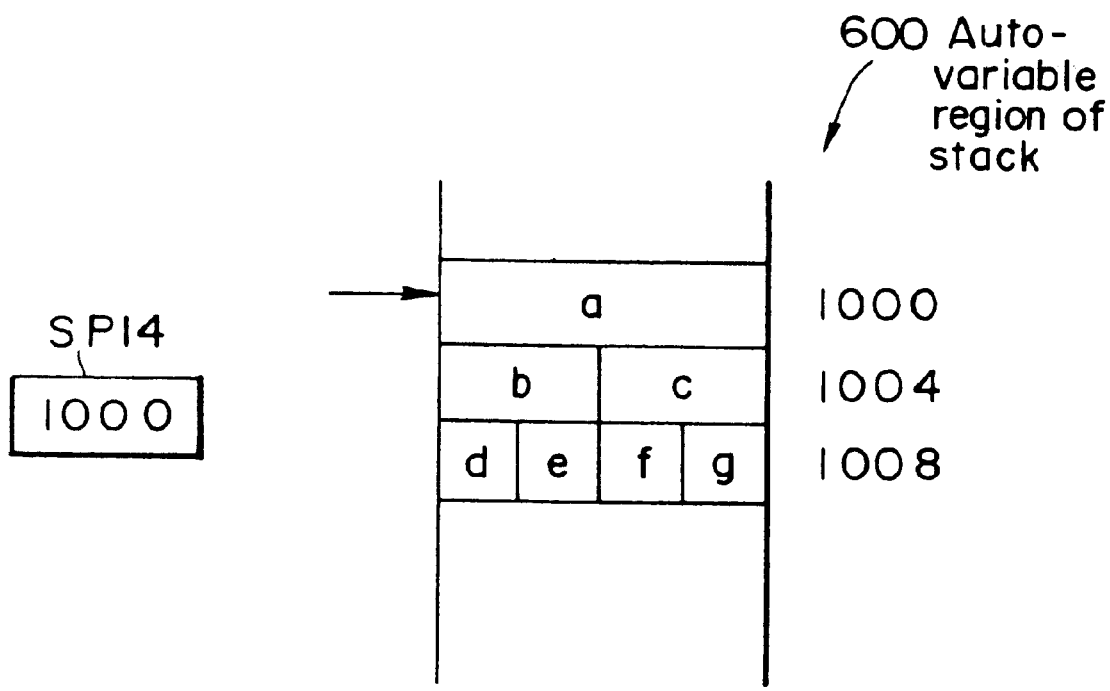
FIG. 5 is a view illustrative of the process of transferring auto-variables in memory to registers.

A view used for illustrating the process of transferring auto-variables in memory to registers is shown in FIG. 5. In this figure, auto-variable a is word data, auto-variables b and c are each half-word data, and auto-variables d to g are each byte data. The stack pointer stored in the SP indicates 1000, which is the address of the top region of a region 600 of the stack in which auto-variables are stored. An area of the stack at the memory address indicated by the stack pointer is secured as an area for holding the auto-variable a. Areas in the stack at memory addresses indicated by the stack pointer plus 2 and the stack pointer plus 4 are secured as areas for holding the auto-variables b and c, respectively. Similarly, areas in the stack at memory addresses indicated by the stack pointer plus 5, the stack pointer plus 6, the stack pointer plus 7, and the stack pointer plus 8 are secured as areas for holding the auto-variables d to g, respectively. During the execution of a given process, it may be necessary to transfer data between a general-purpose register and an auto-variable which is specified by a memory address that is the stack pointer plus an offset.

To enable the CPU of this embodiment to execute the above transfer processing efficiently with shorter object code, the following instruction set is provided as SP-relative load instructions that are some of the dedicated stack pointer instructions:

| | |
|---|---|
| ld.b %Rd, [%sp+imm6] | (1) |
| ld.ub %Rd, [%sp+imm6] | (2) |
| ld.h %Rd, [%sp+imm7] | (3) |
| ld.uh %Rd, [%sp+imm7] | (4) |
| ld.w %Rd, [%sp+imm8] | (5) | ld.b [%sp+imm6], %Rs (6)

ld.h [%sp+imm7], %Rs (7)

ld.w [%sp+imm8], %Rs (8)

Instructions (1) to (8) are instruction codes created by an assembler. Instruction (1) sign-expands byte data and transfers it from the stack to a register, instruction (2) zero-expands byte data and transfers it from the stack to a register, instruction (3) sign-expands half-word data and transfers it from the stack to a register, instruction (4) zero-expands half-word data and transfers it from the stack to a register, instruction (5) transfers word data from the stack to a register, instruction (6) transfers byte data from a register to the stack, instruction (7) transfers half-word data from a register to the stack, and instruction (8) transfers word data from a register to the stack.

The operands [%sp+imm6], [%sp+imm7], and [%sp+imm8] each represent immediate offset data. A memory address is created by adding an offset that is created during the execution of the instruction on the basis of this immediate offset data and the value of the stack pointer stored in the SP 14. [%sp+imm6] is immediate offset data used when the size of the data in memory is bytes, [%sp+imm7] is that when the data size is half-words, and [%sp+imm8] is that when the data size is words. Whichever size of data is used, it is written as 6-bit immediate offset data 614 in the object code, as will be described later with reference to FIG. 6A. If imm7 is used (in other words, if the data size is half-words), however, the immediate offset data 614 is shifted one bit to the left during the execution of the instruction, to generate an offset to be added to the stack pointer. Similarly, if imm8 is used (in other words, if the data size is words), the immediate offset data 614 is shifted two bits to the left, to generate an offset to be added to the stack pointer.

In this case, the stack is a temporary storage region provided in memory and the above memory addresses can be used to specify the locations of, for example, auto-variables (a to g) within the stack, as shown in FIG. 5.

Figure 6A:
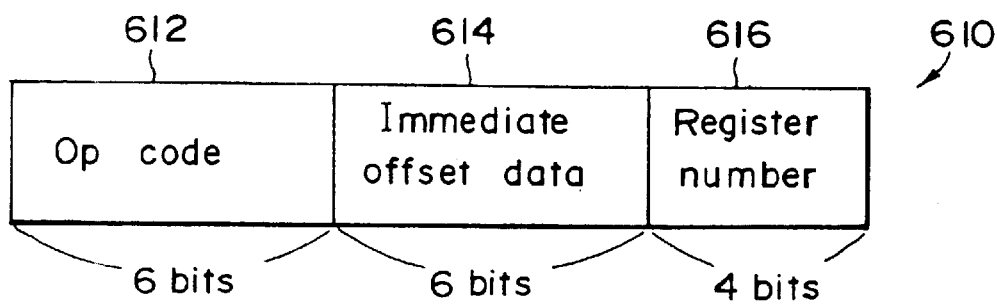
FIGS. 6A and 6B show the bit fields of an SP-relative load instruction and a general-purpose load instruction.

An example of a bit field 610 of these SP-relative load instructions (1) to (8) is shown in FIG. 6A. The SP-relative load instruction of FIG. 6A has 16 bits of object code comprising op code 612 (6 bits) indicating that the operating function is a transfer of data between memory and a general-purpose register, immediate offset data 614 (6 bits) specified by immediate data, and a register number 616 (4 bits) specifying the register that is to be used for the transfer. The op code 612 comprises common code indicating that this is a load instruction that acts upon the SP 14 and different codes specifying each of data size, sign expansion, and zero expansion. Since it is therefore clear from the op code that these instructions act upon the stack pointer stored in the SP 14, there is no necessity to specify data relating to the stack pointer in the operands of the object code. The immediate offset data 614 is used for creating an offset from the stack pointer for data that is to be transferred. This is specified in 6 bits, regardless of the data size, as described above. With instructions (1) to (5), the address (register number) 616 of the register that is involved in the transfer will contain the number of the register to contain data that has been read out from the stack; with instructions (6) to (8), it will contain the number. of the register that currently contains data to be written to the stack.

Figure 6B:
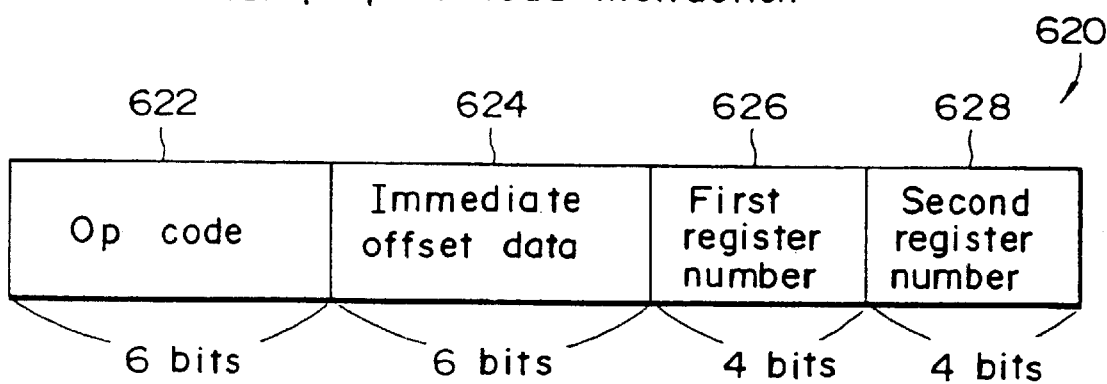

By way of comparison, FIG. 6B shows an example of a bit field 620 of object code of a load instruction that acts upon a general-purpose register when another general-purpose register is used as the stack pointer (hereinafter called a general-purpose load instruction).

The general-purpose load instruction of FIG. 6B has 20 bits of object code comprising op code 622 (6 bits) indicating that the operating function is a transfer of data between memory and a general-purpose register, immediate offset data 624 (6 bits) specified by immediate data, a first register number 620 (4 bits) specifying the general-purpose register to be used as the stack pointer, and a second register number 628 (4 bits) specifying the register that is to be used for the transfer. With a general-purpose microcomputer, the instruction length is in 8-bit units, which gives 24-bit or 32-bit instructions.

Each of FIGS. 6A and 68 shows object code for an instruction used when transferring data between a register and a memory address specified by adding an offset to the stack pointer. It is clear from these examples that a SP-relative load instruction can be written with shorter object code than a general-purpose load instruction.

The description now turns to the configuration required for executing the above instructions and the operations that occur during this execution, taking as examples the instruction (5) that transfers word data from the stack to a register (since this instruction reads word data from the stack to a register, it is hereinafter. called an SP-relative load instruction for reading word data) and the instruction (8) that transfers word data from a register to the stack (since this instruction writes word data from a register to the stack, it is hereinafter called an SP-relative load instruction for writing word data).

The hardware configuration necessary for executing the instructions will be described first, using FIG. 1 for reference. Each of these instructions is transferred over the I_DATA_BUS 94 from an external memory (ROM) 52 and is input to the instruction decoder 20. The instruction is decoded by the instruction decoder 20, which outputs various signals (not shown in the figure) necessary for executing the instruction. The immediate data generator 22 performs a leftward logical shift on the immediate offset data 614 in accordance with the data size, generates the offset used during the execution of sign expansion or zero expansion, if necessary, and outputs the results to the PB_BUS 74. The SP 14 contains the stack pointer, and that value can be output to the XA_BUS 78 which is connected to an input of the address adder 30. Another input of the address adder 30 is connected to the PB_BUS 74 that is an output of the immediate data generator 22. An output (ADDR) of the address adder 30 is connected to the external D_ADDR_BUS 96 by the DA signal line 84.

BCU (bus control unit) 60 controls the input and output of data to and from memory (RAM and ROM) 50 and 52 (which includes the stack area) and outputs READ and WRITE control signals in accordance with various request signals that are output from the CPU (such as signals output to external buses).

The description first concerns the operation during the execution of an SP-relative load instruction for reading word data.

When the SP-relative load instruction for reading word data is executed, the value of the stack pointer stored in the SP 14 is added to the offset created by the immediate data generator 22 on the basis of the immediate offset data 614, to create a memory address for reading. Data is read from memory on the basis of this memory address and is transferred to the general-purpose register specified by the register number 616 in the object code.

A flowchart illustrating the operation during the SP-relative load instruction for reading word data is shown in FIG. 7.

At the start of execution of this instruction, the stack pointer stored in the SP 14 is output to the XA_BUS 78 (step 5210). An offset imm created by the immediate data generator 22 from the immediate offset data is then output to the PB_BUS 74 (step S212). The address adder 30 adds the value on the XA_BUS 78 and the value on the PB_BUS 74, then outputs the resultant memory read address (ADDR) over the DA signal line 84 to the D_ADDR_BUS 96 (steps S214 and S216). A data read request signal from the CPU to the BCU 60 becomes active and executes an external memory read cycle (step S218). In other words, the BCU 60 follows the request signal to control the reading of data from memory, using this read address as a memory address, and the output of the data to the D_DATA_BUS 98. The data on the D_DATA_BUS 98 is output to the WW_BUS 76 over. the DIN signal line 86 (step S220). The Value on the WW_BUS 76 is stored in the register (%Rd) having the register number specified by the 4-bit address 616 of the register (Ra/Rs) that is specified in the instruction code for the transfer (step S222).

The description now turns to the operation during the execution of an SP-relative load instruction for writing word data When the SP-relative load instruction for writing word data is executed, the value of the stack pointer stored in the SP 14 is added to the offset created by the immediate data generator 22 on the basis of the immediate offset data 614, to create a memory address for writing to memory. The data stored in the general-purpose register specified by the register number 616 in the object code is transferred to the areas in memory specified by that memory address.

Figure 8:
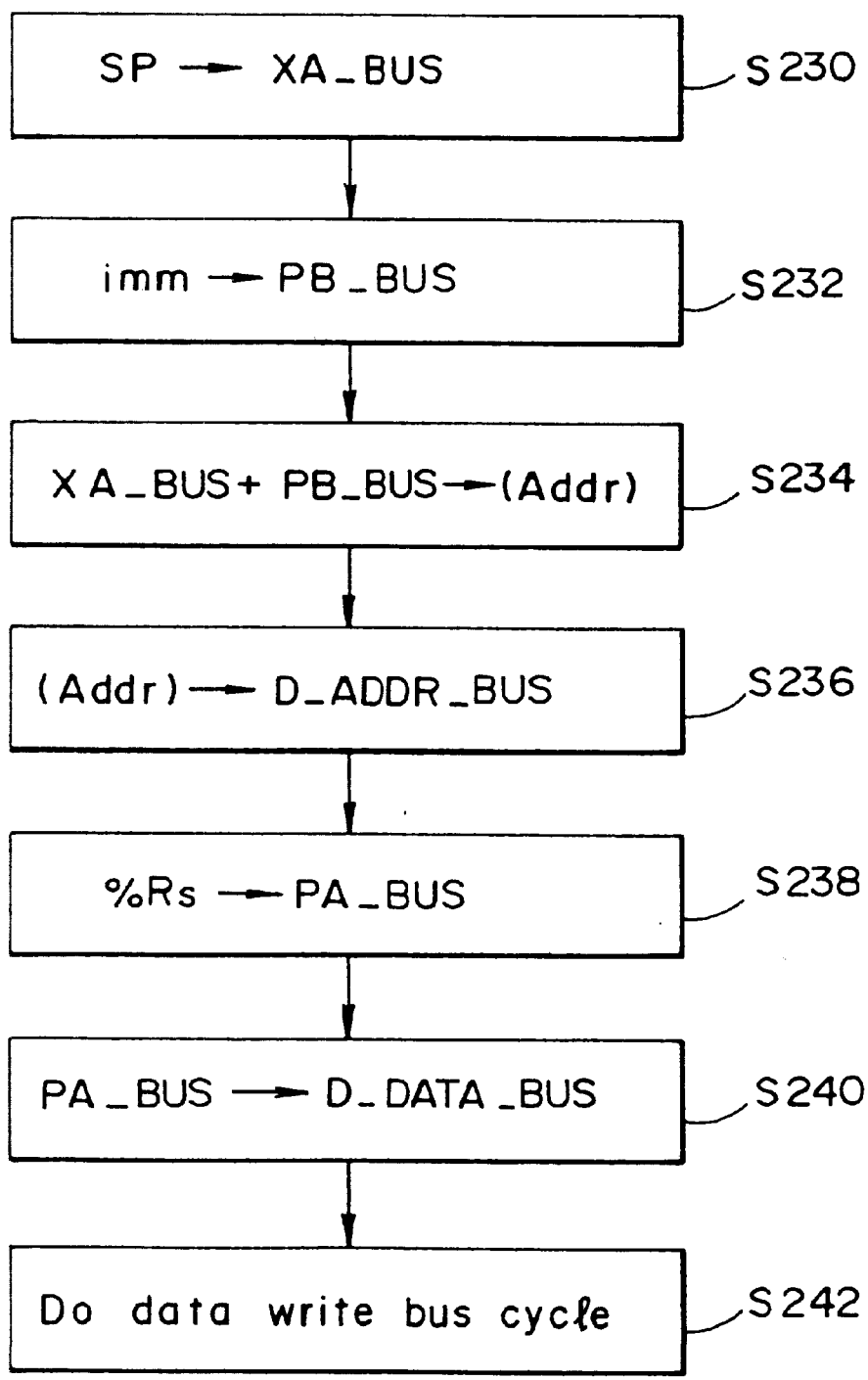
FIG. 8 is a flowchart illustrative of the operation during the SP-relative load instruction for writing word data.

A flowchart illustrating the operation during the SP-relative load instruction for writing word data is shown in FIG. 8.

At the start of execution of this instruction, the stack pointer stored in the SP 14 is output To the XA_BUS 78 (step SZ30). An offset imm created by the immediate data generator 22 from the immediate offset data is then output to the PB_BUS 74 (step S232). The address adder 30 adds the value on the XA_BUS 78 and the value on the PB_BUS 74, then outputs the resultant memory write address (ADDR) over the DA signal line 84 to the D_ADDR_BUS 96 (steps S234 and S236). The data stored in the register (%Rd) having the register number specified by the 4-bit address 616 of the register (Rs/Rd) that is specified in the instruction code for the transfer is output to the PA_BUS 72 (step S238). The data on the PA_BUS 72 is output to the D_DATA_BUS 98 over the DOUT signal line 88 (step S240). A data write request signal from the CPU to the BCU 60 becomes active and executes an external memory write cycle (step S242). In other words, the BCU 60 follows the request signal to control the operation of writing to memory the data that has been transferred to the D_DATA_BUS 98, using this write address as a memory address.

(6) Stack Pointer Move Instruction

Views used to illustrate the usage state of the stack in memory and the state of the stack pointer during each routine of a program that extends over a plurality of routines are shown in FIGS. 9A to 9F.

The states of the stack region in memory and the stack pointer (the value stored in the SP 14) during the execution of a given process 'a' 211 of a MAIN routine 210 of FIG. 9A are shown in FIG. 9D. Reference number 222 denotes a stack region that is to be used by the MAIN routine 210, and the stack pointer indicates a higher address 232 of the region 222.

A SUB1 routine 212 of FIG. 9B is a subroutine that is called and executed from the MAIN routine 210. The states of the stack region in memory and the stack pointer (the value stored in the SP 14) during the execution of a given process 'b' 213 of the SUB1 routine 212 are shown in FIG. 9E. Reference number 224 denotes a stack region that is to be used by the SUB1 routine 212, and the stack pointer indicates a higher address 234 of the region 224.

A SUB2 routine 214 shown in FIG. 9C is called and executed from the SUB1 routine 212. The states of the stack region in memory and the stack pointer (the value stored in the SP 14) during the execution of a given process 'c' 215 of the SUB2 routine 214 are shown in FIG. 9F. Reference number 226 denotes a stack region that is to be used by the SUB2 routine 214, and the stack pointer indicates a higher address 236 of the region 226.

When execution extends over a plurality of subroutines in this manner, the stack region used by each routine moves, so that the value of the stack pointer is moved as appropriate to the top of the stack region used by each routine.

To enable the CPU of this embodiment to execute this movement of the stack pointer efficiently with shorter object code, the following instruction set is provided as stack pointer move instructions that are some of the dedicated stack Pointer instructions:

$$\text{add } \%sp, imm12 \qquad (9)$$

$$\text{sub } \%sp, imm12 \qquad (10)$$

Instructions (9) and (10) are instruction codes created by an assembler. Instruction (9) is an immediate data add instruction for the stack pointer stored in the SP 14 and instruction (10) is an immediate data subtract instruction for this stack pointer. The operand imm12 is 32-bit data obtained by shifting the 10-bit immediate data by two bits leftward then subjecting it to zero expansion. It is used for operations with the stack pointer that is stored in the SP 14.

Figure 10A:
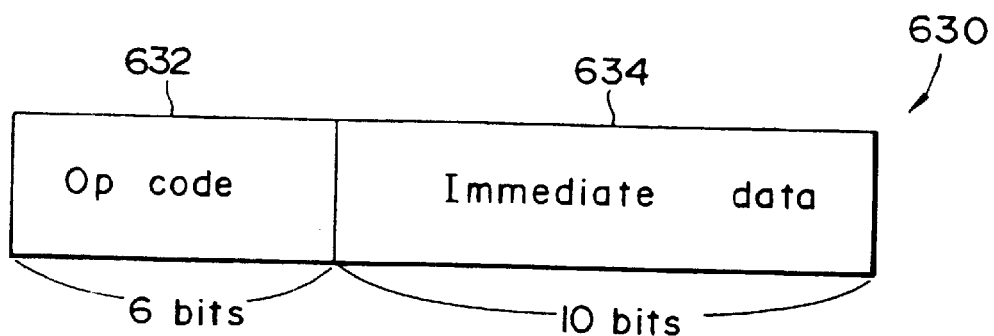
FIGS. 10A and 10B show the bit fields of a stack pointer move instruction and a general immediate data arithmetic instruction.

A bit field 630 of the stack pointer move instructions (9) and (10) is shown in FIG. 10A. The stack pointer move instruction of FIG. 10A has 16 bits of object code comprising op code 632 (6 bits) indicating whether the move data for the stack pointer stored in the SP 14 is an addition or subtraction and immediate data 634 (10 bits). This op code 632 comprises common code indicating that this is a stack pointer move instruction that acts upon the SP 14 and different codes specifying either addition or subtraction. Since it is therefore clear from the op code that these instructions operated upon the stack pointer stored in the SP 14, there is no necessity to specify data relating to the stack pointer in the operands of the object code. The immediate offset data 634 is used for creating an offset for subtracting from or adding to the stack pointer.

Figure 10B:
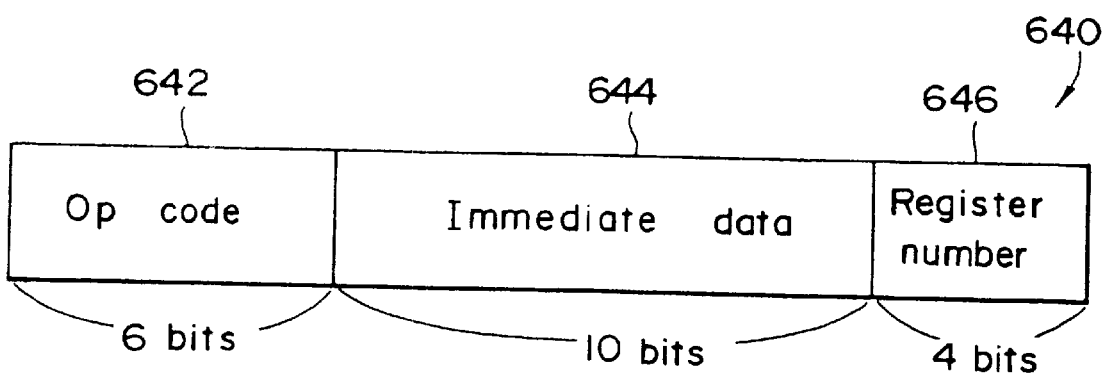

By way of comparison, FIG. 10B shows an example of a bit field 640 of object code of an add/subtract instruction when a general-purpose register is used as the stack pointer, (hereinafter called a general-purpose calculation instruction).

The general-purpose calculation instruction of FIG. 108 has 20 bits of object code comprising op code 642 (6 bits) indicating that the operating function is a addition or subtraction of immediate data to or from a value in a general-purpose register, immediate data 644 (10 bits), and a register number 646 (4 bits) specifying the register that is to be operated upon. With a general-purpose microcomputer, the instruction length is in 8-bit units, which gives 24-bit or 32-bit instructions.

Each of FIGS. 10A and 10B shows object code for an instruction used when adding or subtracting immediate data to or from the stack pointer. It is clear from these examples that a stack pointer move instruction can be written with shorter object code than a general-purpose calculation instruction.

The description now turns to the configuration required for executing the above instructions and the operations that occur during this execution, taking as an example the instruction (9) that adds immediate data to the SP (hereinafter called an add stack pointer move instruction) and the instruction (10) that subtracts immediate data from the SP (hereinafter called a subtract stack pointer move instruction).

The hardware configuration necessary for executing the instructions will be described first, using FIG. 1 for reference. Each of these instructions is transferred over the I_DATA_BUS 94 from an external memory (ROM) 52 and is input to the instruction decoder 20. The instruction is decoded by the instruction decoder 20, which outputs various signals (not shown in the figure) necessary for executing the instruction. The immediate data generator 22 performs a logical shift by two bits to the left on the 10 bits of the immediate data 634, subjects it to zero expansion, and outputs it to the PA_BUS 72. The SP 14 contains the stack pointer, and that value is output to the XA_BUS 78. The XA_BUS 78 is connected to the PB_BUS 74 which forms an input of the ALU 40. Another input of the ALU 40 is connected to the PA_BUS 72 that is an output of the immediate data generator 22. The output of the ALU 40 is connected to the WW_BUS 76. This WW_BUS 76 is connected to the input of the SP.

The description first concerns the operation during the execution of the add stack pointer move instruction.

When the add stack pointer move instruction is executed, the value of the stack pointer stored in the SP 14 is added to the offset created by the immediate data generator 22 on the basis of the immediate offset data 634, to create a new stack pointer. That value is stored in the SP 14.

Figure 11:
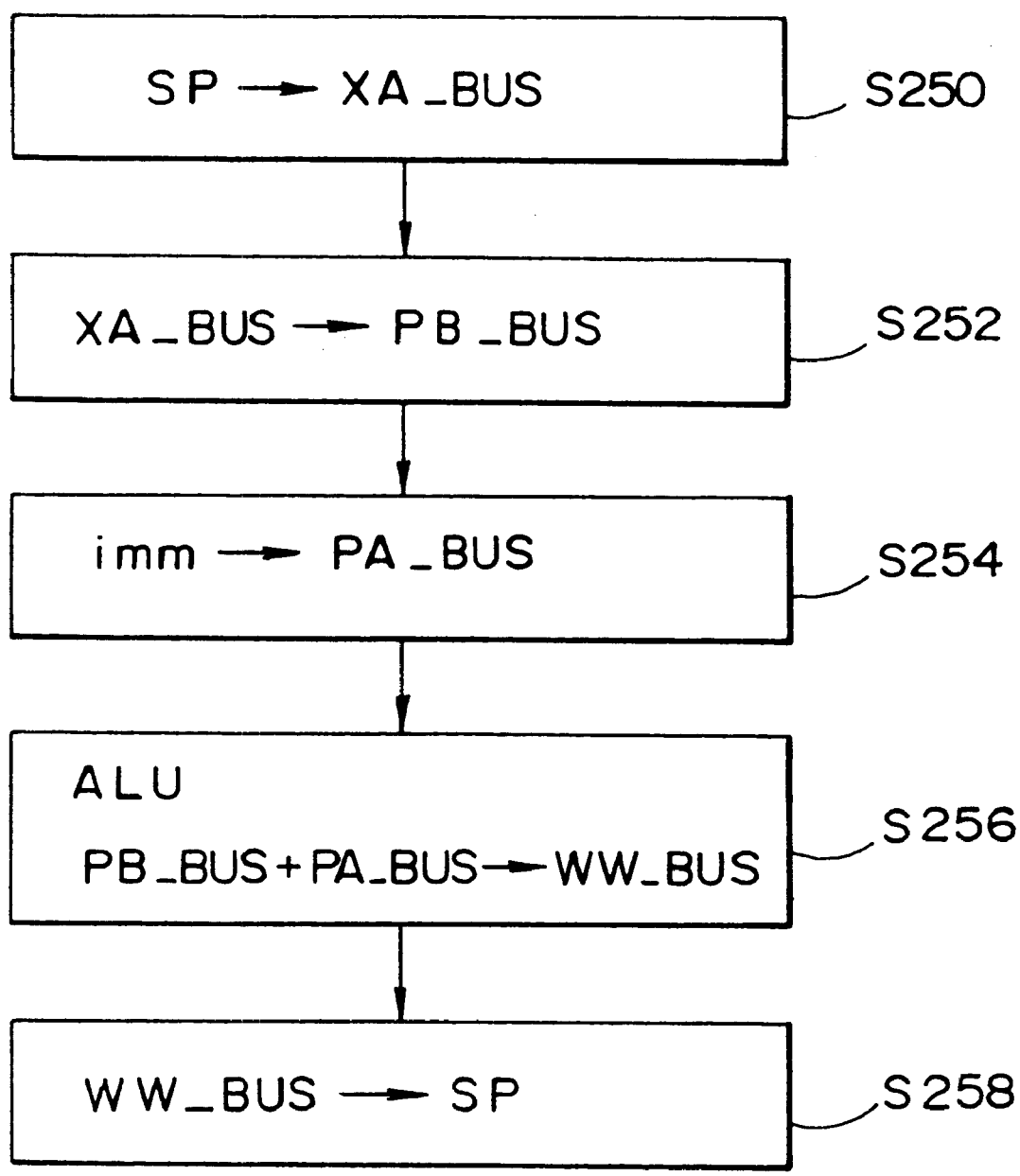
FIG. 11 is a flowchart illustrative of the operation during the add stack pointer move instruction.

A flowchart illustrating the operation during the add stack pointer move instruction is shown in FIG. 11.

At the start of execution of this instruction, the stack Pointer stored in the SP 14 is output to the XA_BUS 78 (step S250). The data on the XA_BUS 78 is output to the PB_BUS 74 (step 5252). Move immediate data imm created by the immediate data generator 22 on the basis of the immediate data is output to the PA_BUS 72 (step S254). The ALU 40 adds the value on the PB_BUS 74 and the value on the PA_BUS 72, and outputs the result to the WW_Bus 76 (step S256). The value on the WW_BUS 76 is then input to the SP 14 (step S258). The description now turns to the operation during the execution of the subtract stack pointer move instruction.

When the subtract stack pointer move instruction is executed, the move immediate data created by the immediate data generator 22 on the basis of the immediate data 634 is subtracted from the value of the stack pointer stored in the SP 14 to create a new stack pointer. That value is stored in the SP 14.

Figure 12:
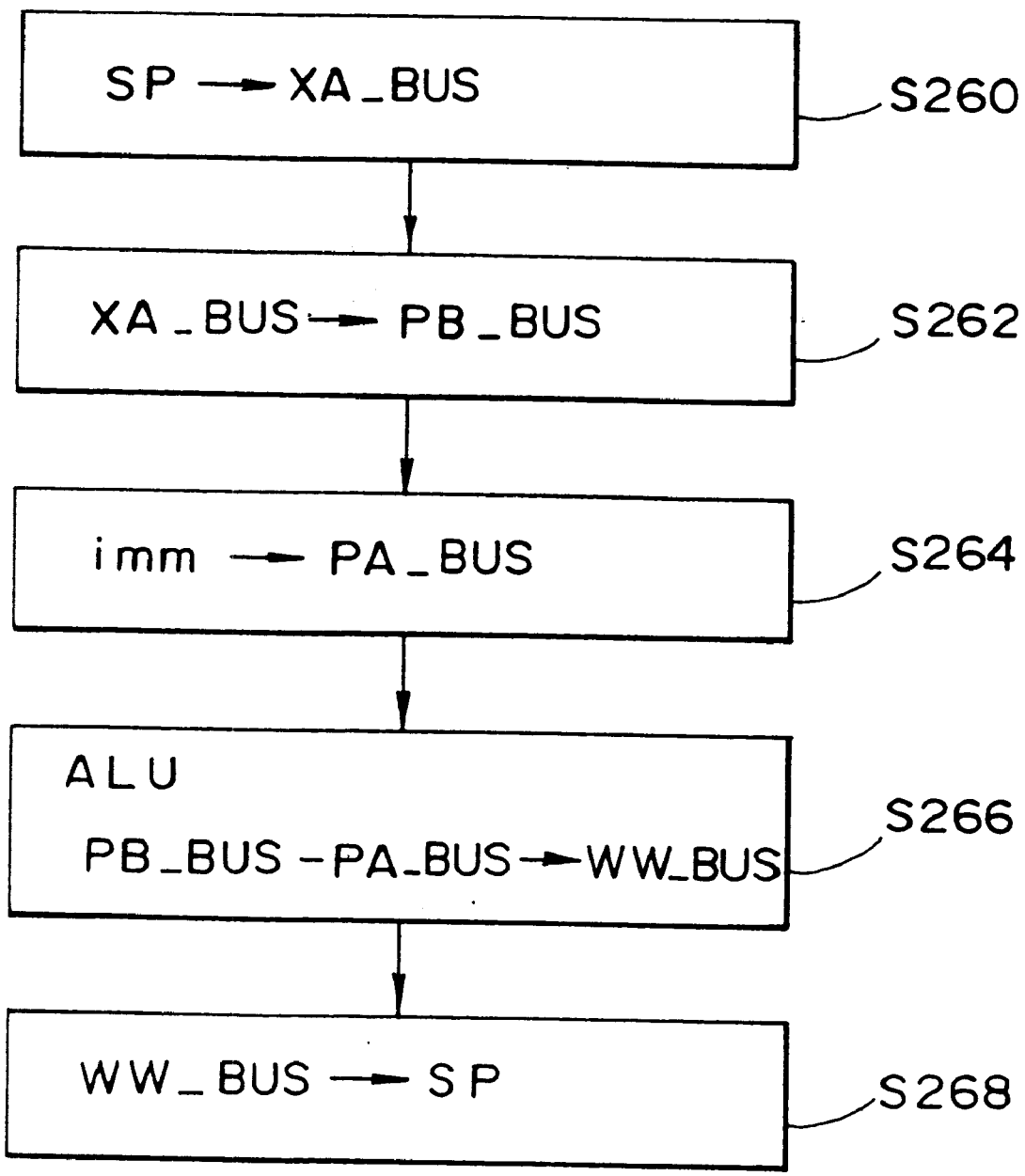
FIG. 12 is a flowchart illustrative of the operation during the subtract stack pointer move instruction.

A flowchart illustrating the operation during the subtract stack pointer move instruction is shown in FIG. 12.

At the start of execution of this instruction, the stack pointer stored in the SP 14 is output to the XA_BUS 78 (step S260). The data on the XA_BUS 78 is then output to the PB_BUS 74 (step S262). Move immediate data imm created by the immediate data generator 22 on the basis of the immediate data is output to the PA_BUS 72 (step S264). The ALU 40 subtracts the value on the PA_BUS 72 from the value on the PB_BUS 74, and outputs the result to the WW_BUS 76 (step S266). The value on the Ww_BUS 76 is then input to the SP 14 (step S268).

(7) Branch Instruction

Figure 13:
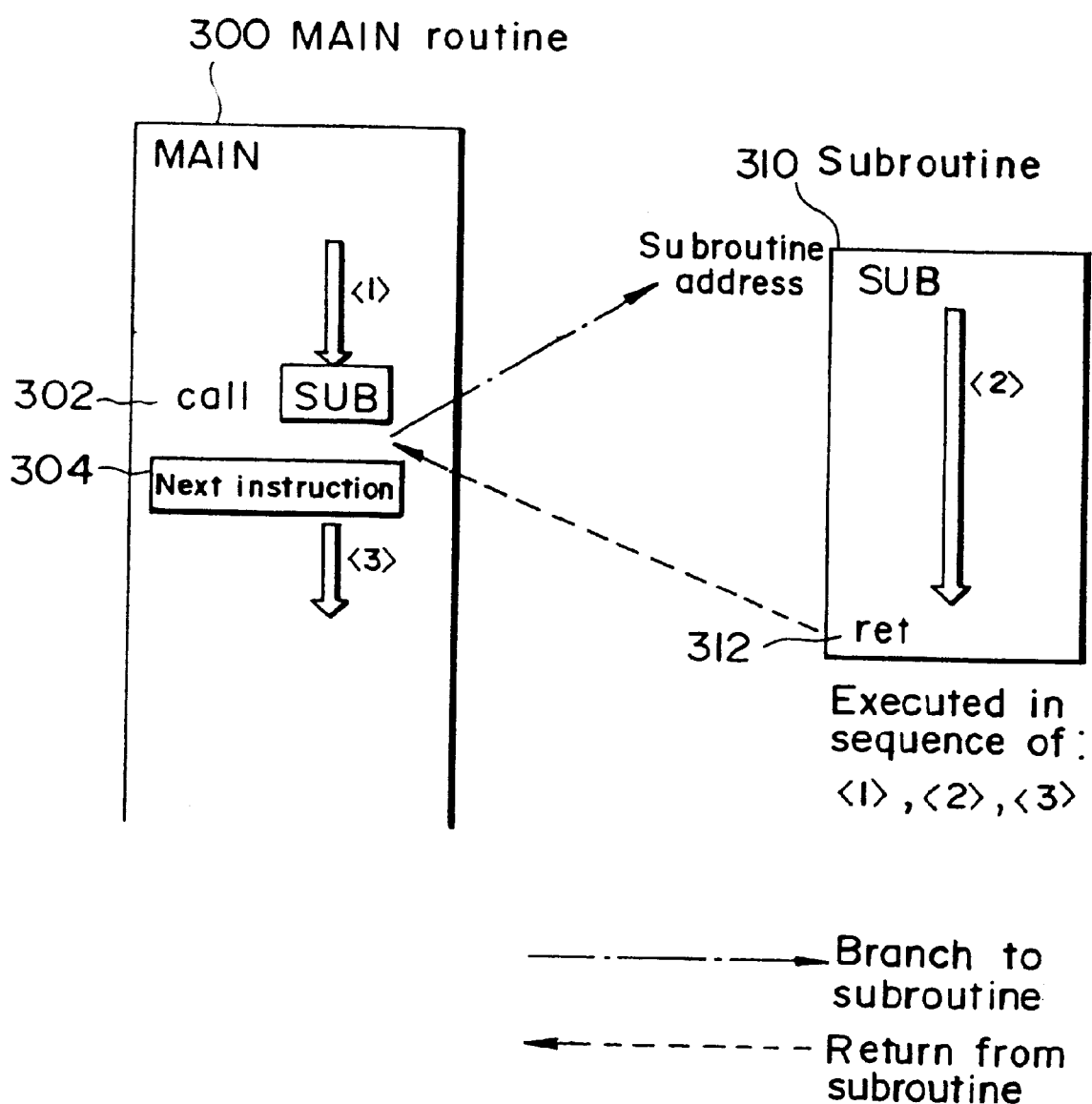
FIG. 13 is a, view illustrative of program execution control during the call and ret instructions.

A View illustrating program execution control during the call and ret instructions is shown in FIG. 13. During a MAIN routine 300 shown in FIG. 13, a call instruction (302) is executed to branch to a subroutine SUB 310, so that control passes to the subroutine SUB 310. A ret instruction (312) is placed at the end of the subroutine. When this instruction is executed, the flow returns to the next the instruction (304) after the call instruction (302) of the MAIN routine 300.

Therefore, the program is executed in the sequence <1>, <2>, then <3> in FIG. 13. At the end of the execution of this subroutine SUB 310, control returns to the MAIN routine 300 and execution is to continue from the next instruction (304) after the call instruction (302). This makes it necessary to record the address of the return. destination somewhere, when a branch occurs to the subroutine SUB 310. For that reason, the return destination address is saved to the stack as shown in FIG. 4 during the execution of a branch instruction that branches to a subroutine, such as the call instruction, then the return destination address is returned from the stack to the program counter during the execution of a branch instruction that returns from a subroutine, such as the ret instruction (this process is hereinafter called saving and restoring the program counter).

With a prior-art RISC CPU, the process of saving and restoring the program counter is done by software, so that it is necessary to provide object code (assembler instructions) for executing this process during the execution of a branch instruction such as the call instruction. For example, it is necessary to provide object code (assembler instructions) for decrementing the stack pointer by an amount equivalent to the to word size (4) during the execution of the call instruction, to place the address of the next instruction after the call instruction in the stack on the basis of the value in the program counter.

The CPU of this embodiment, however, has a hardware configuration that enables the saving and restoration of the program counter when the call or ret instruction is executed. It is therefore not necessary to provide object code (assembler instructions) that saves and restores the program counter separately from the object code of the call and ret instructions.

To enable the CPU of this embodiment to execute this process of saving and restoring the program counter by a single instruction, the following instruction set is provided as branch instructions that are some of the dedicated stack pointer instructions:

| | |
|---|---|
| call sign9 | (11) |
| call %Rb | (12) |
| ret | (13) |
| reti | (14) |
| retd | (15) |
| int imm2 | (16) |
| brk | (17) |

Instructions (11) to (17) are instruction codes created by an assembler. Instruction (11) is a PC-relative subroutine call instruction which uses the program counter (PC) as a base address, to branch in a relative manner to a branch destination address on the basis of the displacement data sign9 specified as the operand. Instruction (12) is a register indirect subroutine call instruction which branches to the branch destination address contained within the register specified as the operand. Instruction (13) is an instruction for return from a subroutine. Instruction (14) is an instruction for return from an interrupt or exception processing routine. Instruction (15) is an instruction for return from a debugging processing routine. Instruction (16) is a software interrupt instruction. Instruction (17) is a software/debugging interrupt instruction.

Figure 14:
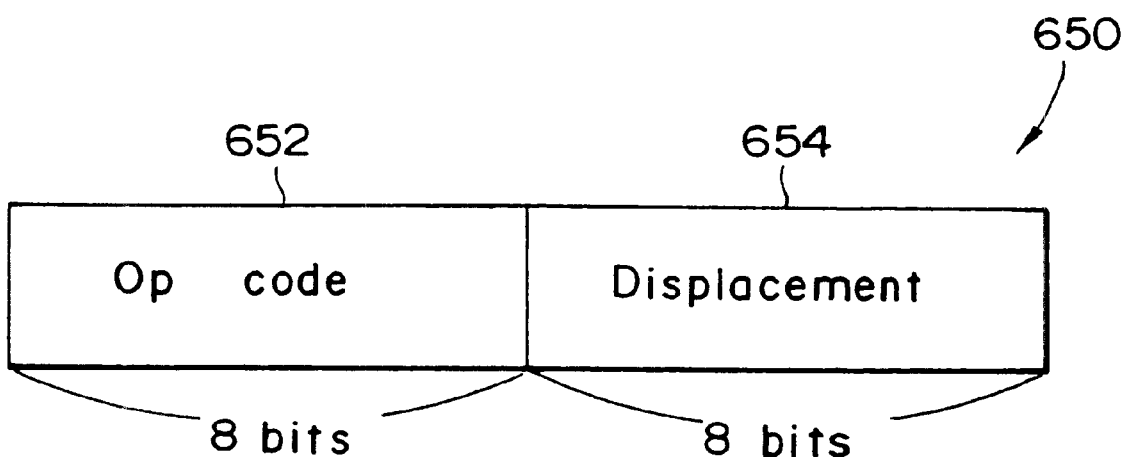
FIG. 14 shows the bit's field of an PC-relative subroutine call instruction.

An example of a bit field 650 of the PC-relative subroutine call instruction (11) is shown in FIG. 14. The PC-relative subroutine call instruction of FIG. 14 has 16 bits of object code comprising op code 652 (8 bits) indicating that the operating function is a call instruction that branches to a subroutine with a branch destination address that is specified relatively, using the program counter as a base address, and displacement data sign9 (8 bits) 654 specified by immediate data. During the execution of this command, the 8-bit immediate data is shifted logically by one bit to the left then is subjected to sign expansion.

The CPU of this embodiment is capable of saving the program counter to the stack at the execution of the call instruction, with only the object code shown in FIG. 14.

The description now turns to the configuration required for executing the above instructions and the operations that occur during this execution, taking as examples the PC-relative subroutine call instruction (11) as an instruction for branching to a subroutine and the return instruction (13) as an instruction for returning from the subroutine.

The hardware configuration necessary for executing the instructions will be described first, using FIG. 1 for reference. Each of these instructions is transferred over the I_DATA_BUS 94 from external memory (ROM) 52 and is input to the instruction decoder 20. The instruction is decoded by the instruction decoder 20, which outputs various signals (not shown in the figure) necessary for executing the instruction. The immediate data generator 22 performs a logical shift by one bit to the left on the displacement data 654, subjects it to sign expansion to create a 32-bit immediate data displacement imm, then outputs the result to the PB_BUS 74. The SP 14 contains the stack pointer, and that value is output to the XA_BUS 78 which is connected to an input of the address adder 30. Another input of the address adder 30 is connected to the PB_BUS 74 that is an output of the immediate data generator 22. An output (ADDR) of the address adder 30 is connected to the external I_ADDR_BUS 92 by the IA signal line 82.

The I_ADDR_BUS 92 and I_DATA_BUS 94 are connected to the ROM 52 in which is stored the instruction object code. The bus control unit (BCU) 60 outputs READ control signals that read this instruction object code from the memory (ROM) 52 in accordance with various request signals that are output from the CPU (such as signals output to external buses).

The description first concerns the operation during the execution of an PC-relative subroutine call instruction.

When the PC-relative subroutine call instruction is executed, the value of the program counter stored in the PC 12 is saved to the stack as described with reference to FIG. 4, and the value of the stack pointer stored in the SP 14 is decremented by the word size (4). A branch destination address obtained by adding the program counter and the 32-bit immediate data displacement is set in the PC 12.

Figure 15:
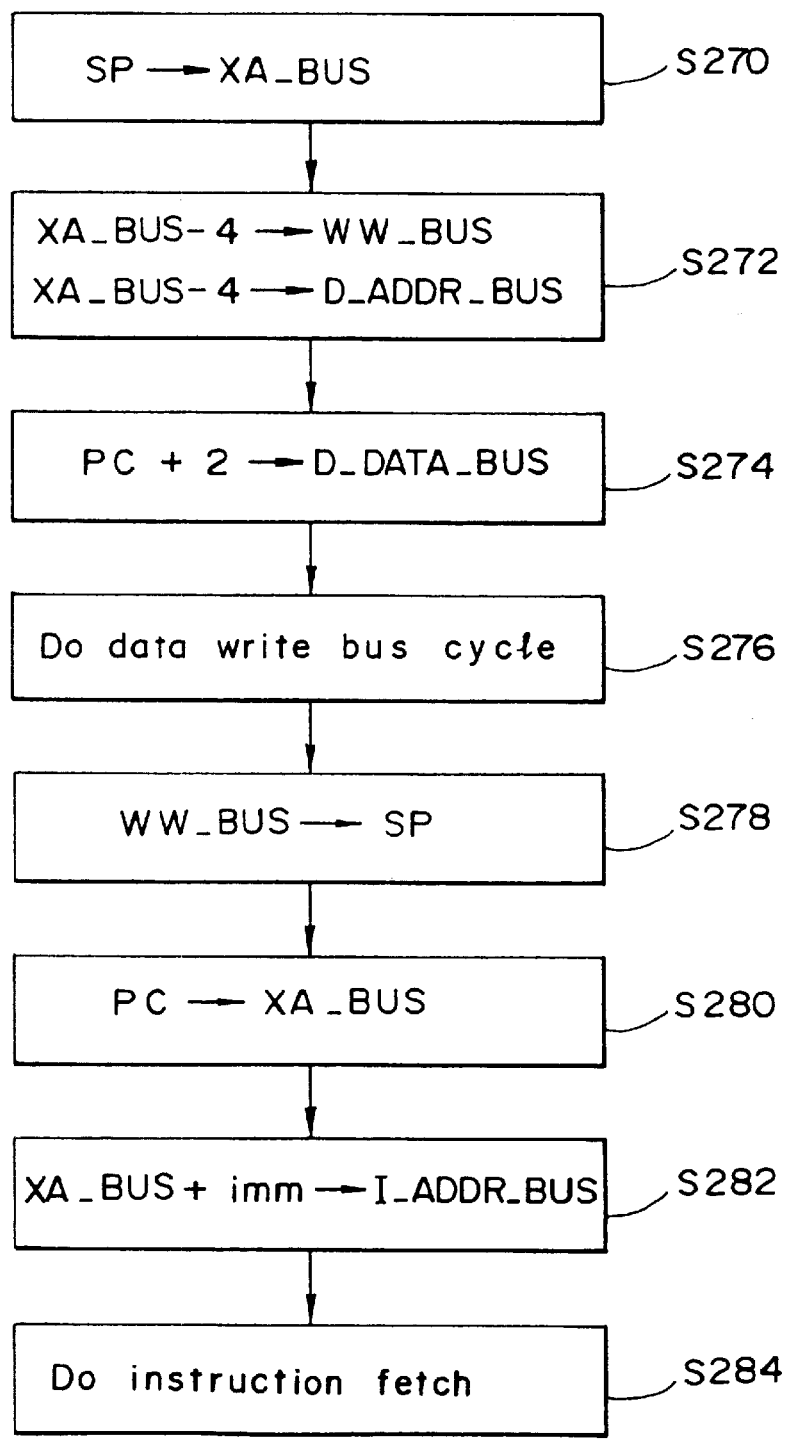
FIG. 15 is a flowchart illustrative of the operation during the PC-relative subroutine call instruction.

A flowchart illustrating the operation during the PC-relative subroutine call instruction is shown in FIG. 15.

At the start of execution of this instruction, the stack pointer stored in the SP 14 is output to the XA_BUS 78 (step S270). This forms one input of the address adder, and constant data (−4) created by the immediate data generator 22 forms the other input of the address adder 30. The constant −4 is added to the value of the stack pointer on the XA_BUS 78 by the address adder 30 to create a write address to the stack for storing the return address, and the result is output to the WW_BUS 76. This write address is output to the D_ADDR_BUS 96 (step S272). The value of the program counter stored in the PC 12 is incremented by 2 by the PC incrementer 44 to create the return address, and the result is output to the D_DATA_BUS 98 over the DOUT signal line 88 (step S274). A data write request signal from the CPU to the BCU 60 becomes active and executes an external memory write cycle (step S276). In other words, the BCU 60 follows the request signal to store this return address in the stack provided in memory, using this write address as a memory address.

The value on the WW_BUS 76 is then output to the SP 14 (step S278). In other words, the value of the stack pointer is updated by being decremented by 4.

The program counter stored in the PC 12 is then output to the XA_BUS 78 (step S280). The immediate data generator 22 performs a logical shift by one bit to the left on the displacement data 654, subjects it to sign expansion to create a 32-bit immediate data displacement imm, then outputs the result to the PB_BUS 74. The address adder 30 adds the program counter on the XA_BUS 78 and the immediate data displacement imm on the PB_BUS 74 to create a branch address (ADDR), then outputs that address over the IA signal line 82 to the I_ADDR_BUS 92 (step S282). An instruction read request signal from the CPU to the BCU 60 becomes active and executes a read cycle with respect to the external memory (ROM) 52 to fetch the object code of the branch destination instruction (step S284).

The operation during the execution of the ret instruction will now be described.

When the ret instruction is executed, the value of the program counter that was saved to the stack is restored to the PC 12, and the value of the stack pointer stored in the SP 14 is incremented by the word size (4), as described with reference to FIG. 4.

Figure 16:
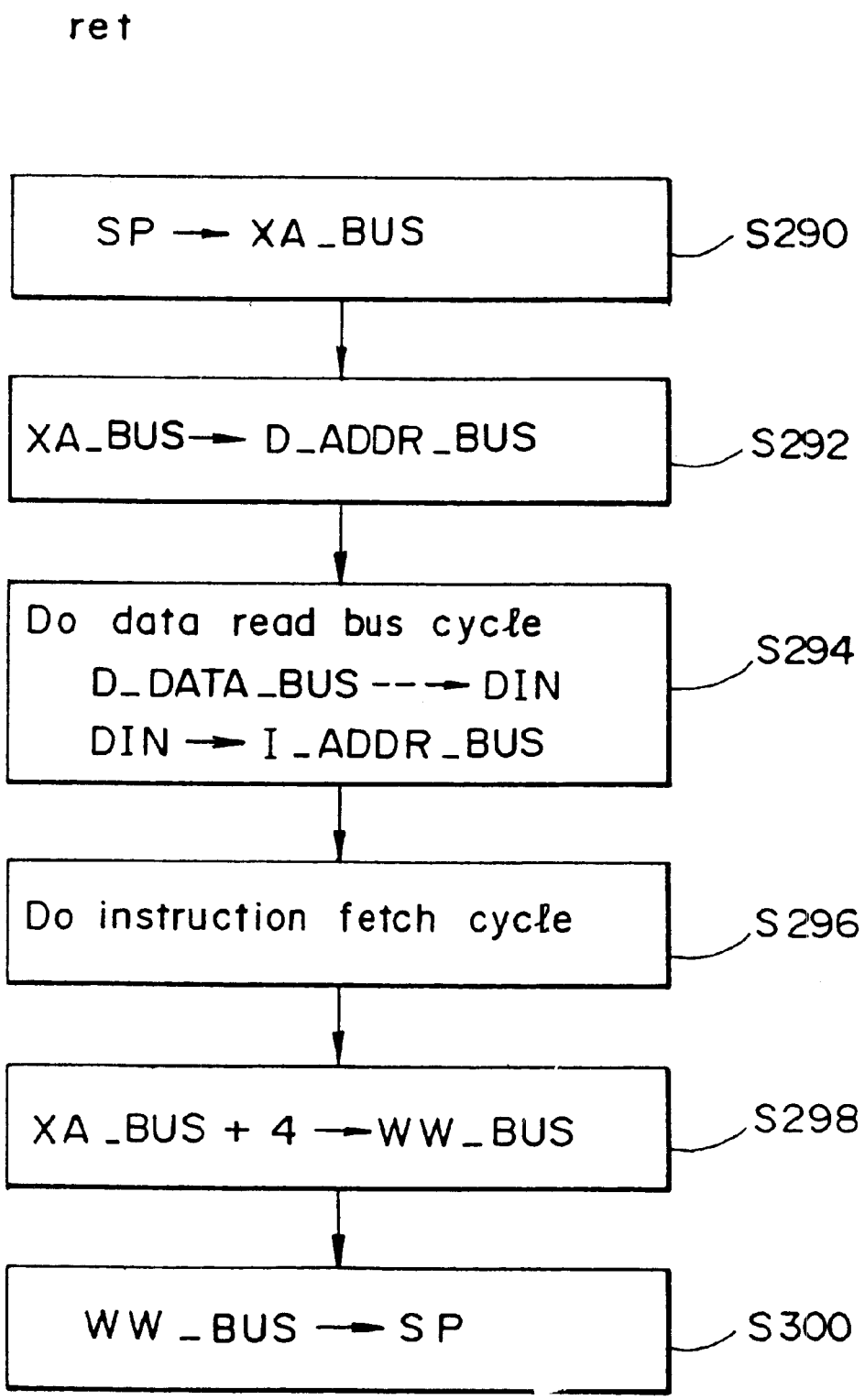
FIG. 16 is a flowchart illustrative of the operation during the ret instruction.

A flowchart illustrating the operation during the ret instruction is shown in FIG. 16.

Before this instruction is executed, the stack pointer stored in the SP 14 indicates the address in the stack containing the destination address for return from the called routine.

At the start of execution of this instruction, the stack pointer stored in the SP 14 is output to the XA_BUS 78 (step S290). The stack pointer on the XA_BUS 78 is then output to the D_ADDR_BUS 96 (step S292). A data read request signal from the CPU to the BCU 60 becomes active and executes an external memory read cycle. In other words, the BCU 60 follows the request signal to read the return address from the stack provided in memory, using the stack pointer as a memory address. This return destination address that has been read from the memory (RAM) 50 is fetched within the CPU from the D_DATA_BUS 94 over the DIN signal line 86, then is output from the DIN signal line 86 to the I_ADDR_BUS 92 over the IA signal line 82 (step S294). An instruction read request signal from the CPU to the BCU 60 becomes active and executes a read cycle with respect to the external memory (ROM) 52 to fetch the object code of the return destination instruction (step S296).

The value of the stack pointer on the XA_BUS 78 is one input of the address adder 30, and constant data (+4) created by the immediate data generator 22 forms the other input of the address adder 30. The constant +4 is added to the value of the stack pointer on the XA_BUS 78 by the address adder 30 to create the address of the top area of the stack region secured by the return destination routine, and the result is output to the WW_BUS 76 (step S298). This address on the WW_BUS 76 (the address of the top area of the stack region secured by the return destination routine) is then output to the SP 14 (step S300).

(8) Description of Sequential Push Instruction (pushn) and Sequential Pop Instruction (popn)

As described previously, it has recently become common to have a configuration with a large number of internal general-purpose registers, particularly in RISC CPUs, to enable processes to run rapidly within the CPU itself, without having to access memory. The CPU of this embodiment incorporates 16 general-purpose registers, designed to increase the speed of processing. However, if there are so many internal registers, the contents of a large number of registers have to be saved during processing that saves and restores registers when an interrupt occurs or a subroutine is called.

When the contents of these registers are saved or restored in the prior art, a push instruction for storing the contents specified by an address or a pop instruction for fetching the contents of the stack to a register is used. The actions of these ordinary push and pop instructions will now be described.

Figure 17A:
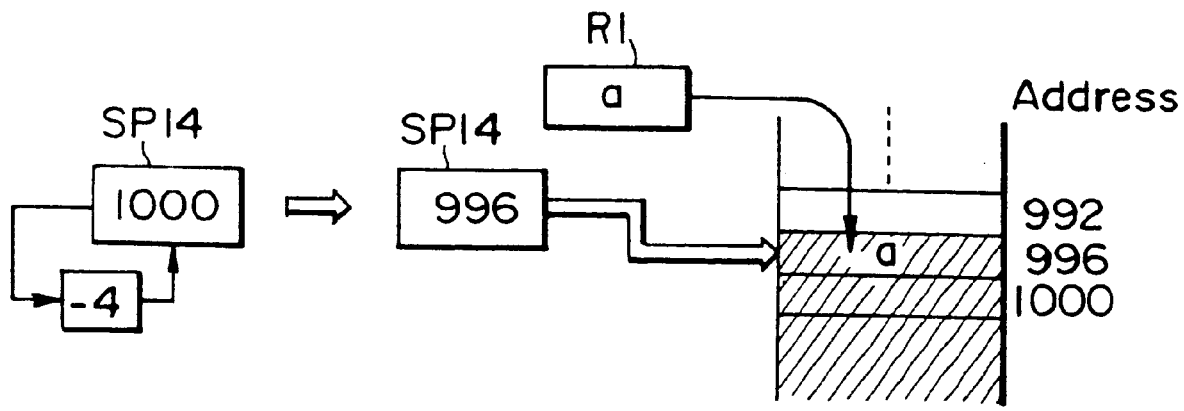
FIGS. 17A and 17B schematically show the actions during the execution of push instructions.
Figure 17B:
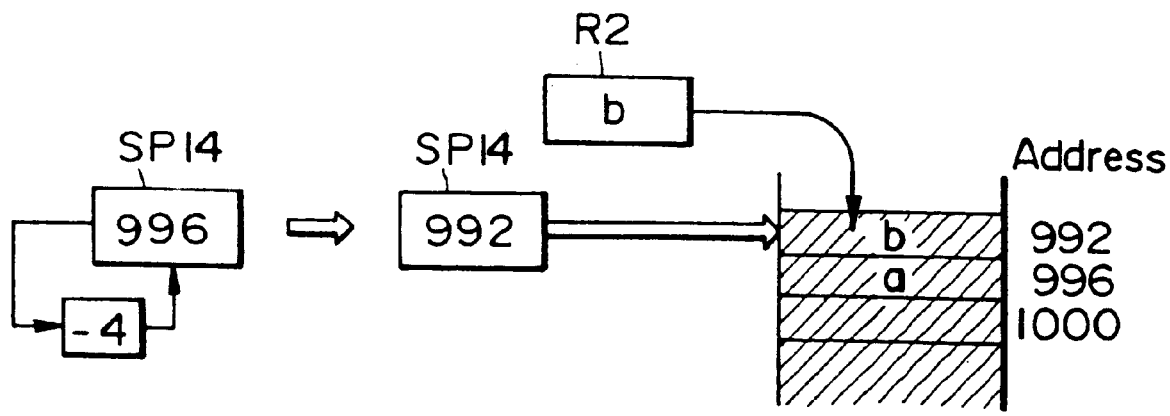
Figure 18A:
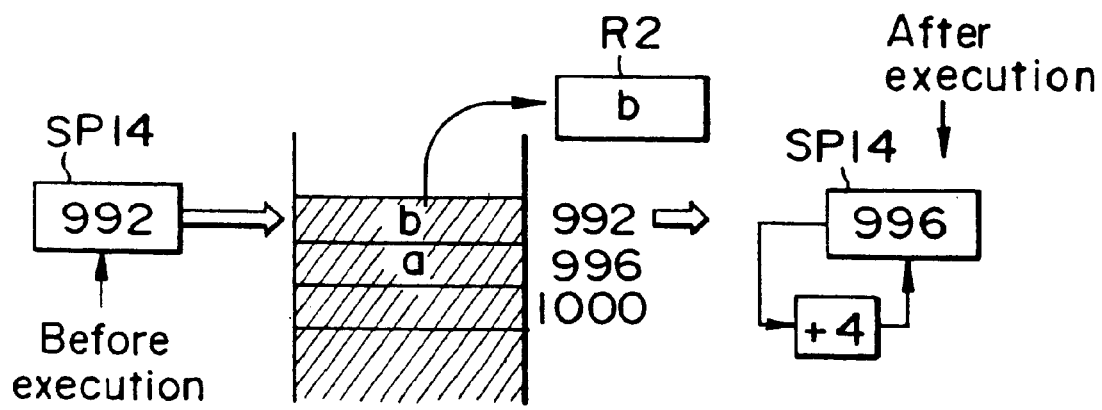
FIGS. 18A and 18B schematically show the actions during the execution of pop instructions.

The actions performed during the execution of push instructions are shown schematically in FIGS. 17A and 17B and the actions during the execution of pop instructions are shown schematically in FIGS. 18A and 188. The actions performed when data is transferred between a plurality of general-purpose registers and the stack will now be described, with reference to FIGS. 17A, 17B, 18A, and 18B.

FIG. 17A shows the actions when a 'push R1' instruction is executed, to write the contents of a general-purpose register R1 to the stack. During the execution of this instruction, the contents of the SP 14 are updated by the subtraction of 4 from the current value (1000 in FIG. 17A is updated to 996). The contents 'a' of the general-purpose register R1 are written to 996, which is the memory address indicated by the updated stack pointer in the SP 14.

FIG. 17B shows the actions when a 'push R2' instruction is executed to further write the contents of a general-purpose register R2 to the stack. During the execution of this instruction, the contents of the SP 14 are updated by the subtraction of 4 from the current value (996 in FIG. 17B is updated to 992). The contents 'b' of the general-purpose register R2 are written to 992, which is the memory address Indicated by the updated stack pointer in the SP 14.

Figure 18B:
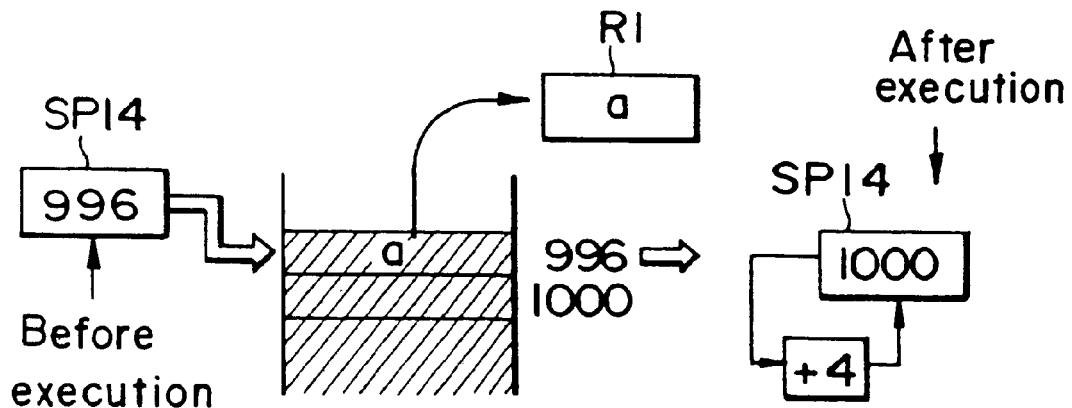

FIG. 18A shows the actions when a 'pop R2' instruction is executed to fetch the contents of the stack to the general-purpose register R2. During the execution of this instruction, the contents 'b' stored at the memory address 992 indicated by the stack Pointer in the SP 14 are fetched and stored in the general-purpose register R2. The contents of the SP 14 are updated by the addition of 4 to the current value (the pre-execution value of 992 in FIG. 18A is updated to 996). Finally, FIG. 18B shows the actions when a 'pop R1' is executed to further fetch the contents of the stack to the general-purpose register R1. During the execution of this instruction, the contents 'a' stored at the memory address 996 indicated by the stack pointer in the SP 14 are fetched and stored in the general-purpose register R1. The contents of the SP 14 are updated by the addition of 4 to the current value (the pre-execution value of 996 in FIG. 188 is updated to 1000).

When data is transferred between a plurality of general-purpose registers and the stack in this example of the prior art, it is necessary to execute push or pop instructions a plurality of times. This is because each execution of a push or pop instruction can only operate on a single register.

Therefore, when processing is performed to save data from a number of registers to the stack, or recover data from the stack to a number of registers, the resultant increase in the number of instructions will lead to an increase in the size of the object code. The number of execution steps in the program will also increase, leading to delays in the execution time or processing of the program.

The following instruction set is provided for the CPU of this embodiment:

pushn %Rs (18)

popn %Rd (19)

Instruction (18) is a sequential push instruction created by an assembler. It sequentially pushes the contents of n general-purpose registers (where n is an integer from 1 to 16) from %Rs to R0 onto the stack. Instruction (19) is a sequential pop instruction created by an assembler. It sequentially pops n items of word data (where n is an integer from 1 to 16) from the stack and pushes them into general-purpose registers %Rd to R0. Each of the pushn and popn instructions consists of op code and an operand. The operand %Rs of the pushn instruction indicates the register number of Rs when data is to be written to the stack from registers %Rs to R0. The operand %Rd of the popn instruction indicates the register number of Rd when data is to be taken from the stack and written to registers R0 to %Rd.

Figure 19:
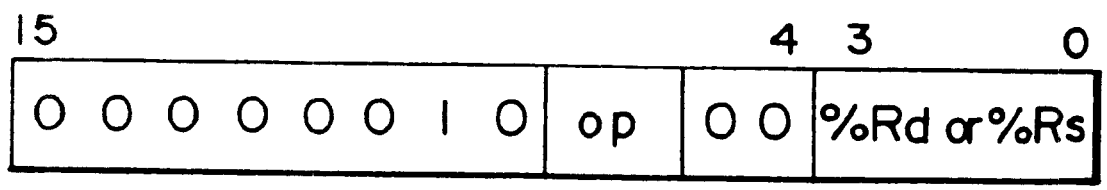
FIG. 19 shows the bit structure of the pushn and popn instructions.

The bit structure of the pushn and popn instructions is shown in FIG. 19. The lowermost 4-bit field contains a code indicating %Rs or %Rd; any of the 16 general-purpose registers can be specified. When data is to be transferred between a special register and the stack, it is transferred via a general-purpose register.

Figure 20:
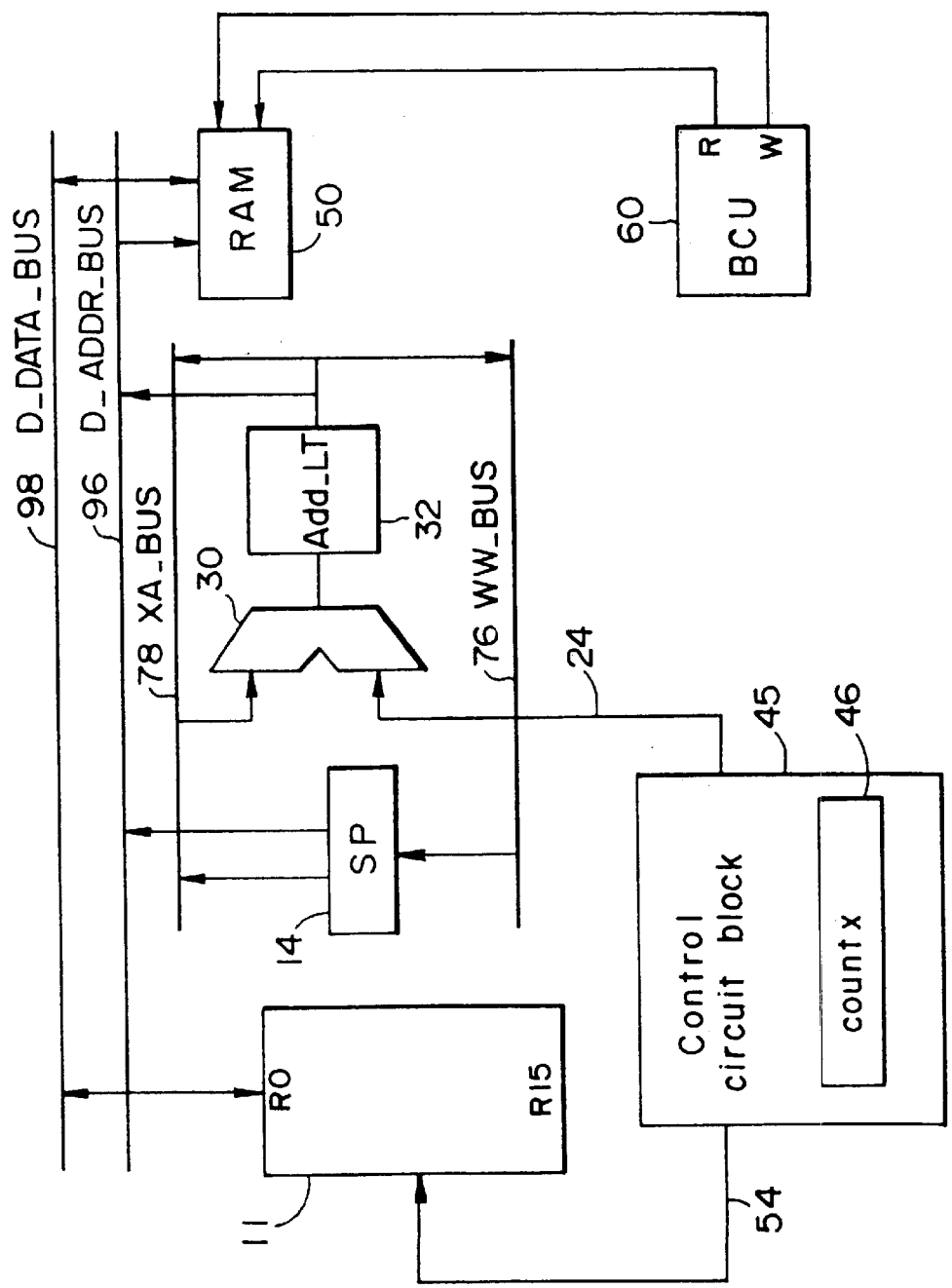
FIG. 20 is a block diagram of the hardware configuration required for executing the sequential push instruction (pushn) or sequential pop instruction (popn)

A block diagram of the hardware configuration required for executing the sequential push instruction (pushn) or sequential pop instruction (popn) is shown in FIG. 20. Portions necessary for the description of the sequential push instruction (pushn) and sequential pop instruction (popn) are extracted from FIG. 1, and further necessary portions are added. Portions that are the same as those in FIG. 1 are given the same reference numbers. In this figure, reference number 11 denotes 16 general-purpose registers called R0 to R15. These general-purpose registers 11 transfer data to and from the D_DATA_BUS 98. A register selection address signal 54 for selecting a register comes from a. control circuit block 45. The stack pointer is stored in the SP 14. The value in the SP 14 can be output to the D_ADDR_BUS 96 and the internal address bus (XA_BUS) 78 that is connected to an input of the 32-bit address adder 30. Another input of the address adder 30 is connected to an offset signal. 24 that is output from the control circuit block 45. An output of the address adder 30 is held by a latch (Add_LT) 32, then is further output to the XA_BUS 78 or the WW_BUS 76. The WW_BUS 76 is connected to the input of the SP 14. There is a 4-bit counter (countx) 46 in the control circuit block 45, to count the number of registers involved in the data transfer. The control circuit block 45 is further provided with an instruction register (not shown in the figure), which holds the operand %Rs or %Rd of the pushn or popn instruction and also outputs control signals in accordance with instructions from the instruction decoder. In this figure, reference number 60 denotes a bus control unit (BCU) that controls the input and output of data to and from external memory (RAM) 50, which includes the stack area and outputs READ and WRITE control signals.

The description first concerns the operation during the execution of a sequential push instruction (pushn).

When the sequential push instruction (pushn) is executed, the contents stored in the general-purpose registers are sequentially pushed into the stack, starting with the register with register number XRs to general-purpose register R0, as described previously with reference to FIG. 4.

Figure 21:
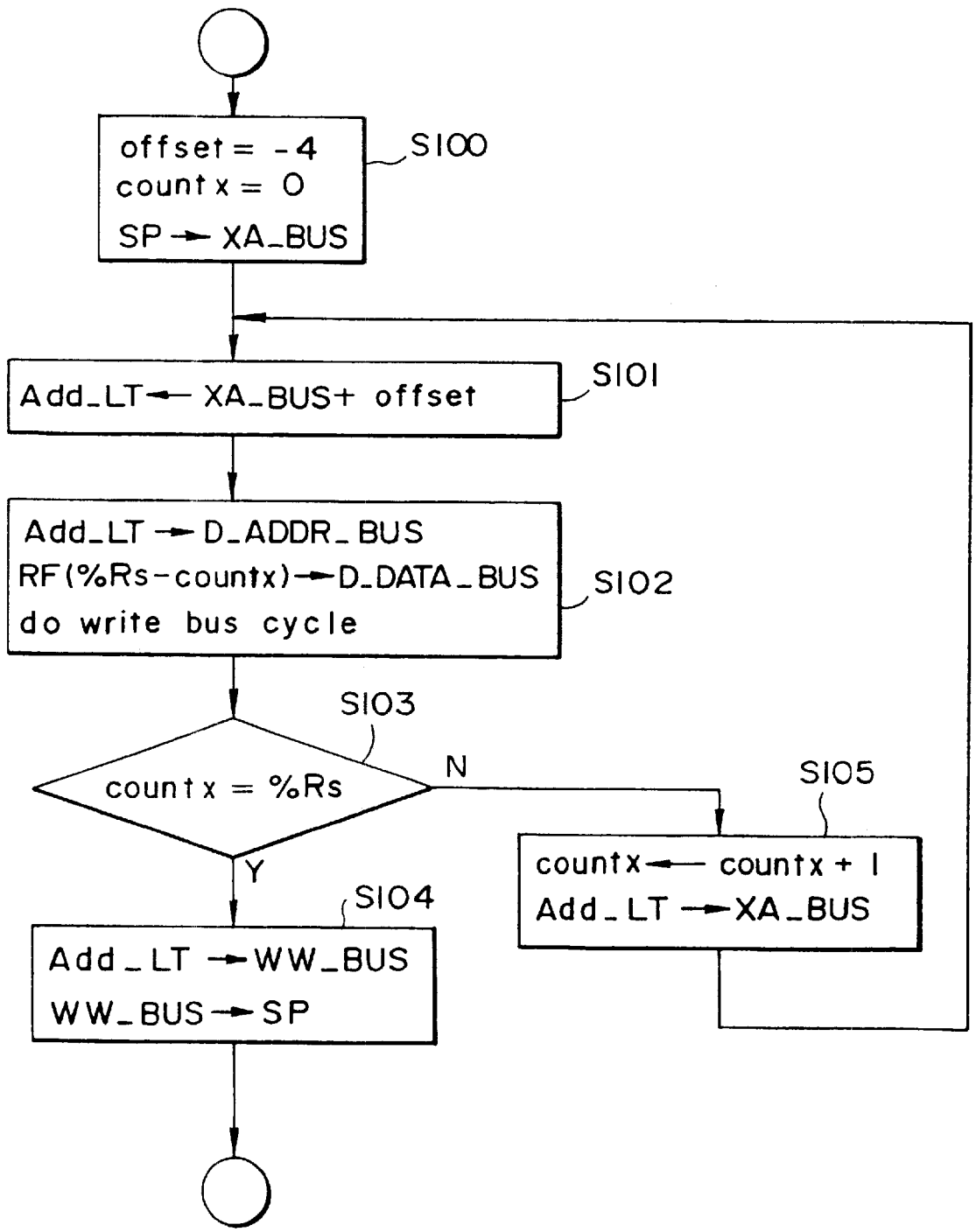
FIG. 21 is a flowchart illustrative of the operation during the pushn instruction.

A flowchart illustrating the operation during the pushn instruction is given in FIG. 21.

At the start of execution of the pushn instruction, the offset of a offset signal 24 is −4. The counter (countx) 46 is cleared to zero and the stack pointer stored in the SP 14 is output to the XA_BUS 78 (step S100).

The address adder 30 then adds −4 to the value on the XA_BUS 78 and inputs the result to the latch (Add_LT) 32 (step S101).

The value in the latch (Add_LT) 32 is then output to the D_ADDR_BUS 96. The difference between the value of %Rs held in the lowermost 4 bits of the instruction register and the value in counter (countx) 46 is calculated by the control circuit block 45 and output to the register selection address signal 54. The register selected by this signal 54 is linked to the D_DATA_BUS 98 and a write is performed with respect to the external memory (RAM) 50 (step S102).

In a step S103, the counter (countx) 46 is compared with %Rs. If they match, the writing of registers to external memory has been completed and the execution of the pushn instruction ends by the writing of the value in the latch (Add_LT) 32 to the SP 14 through the WW_BUS 76 (step S104).

If they do not match, the counter (countx) is incremented by 1, the value in the latch (Add_LT) 32 is output to the XA_BUS 78, and the processing from step S101 onward is repeated (step S105).

The operation during the execution of a sequential pop instruction (popn) will next be described.

When a sequential pop instruction (popn) is executed, the contents of the stack are sequentially pushed from the general-purpose register R0 to the general-purpose register with register number XRd, as described above with reference to FIG. 4.

Figure 22:
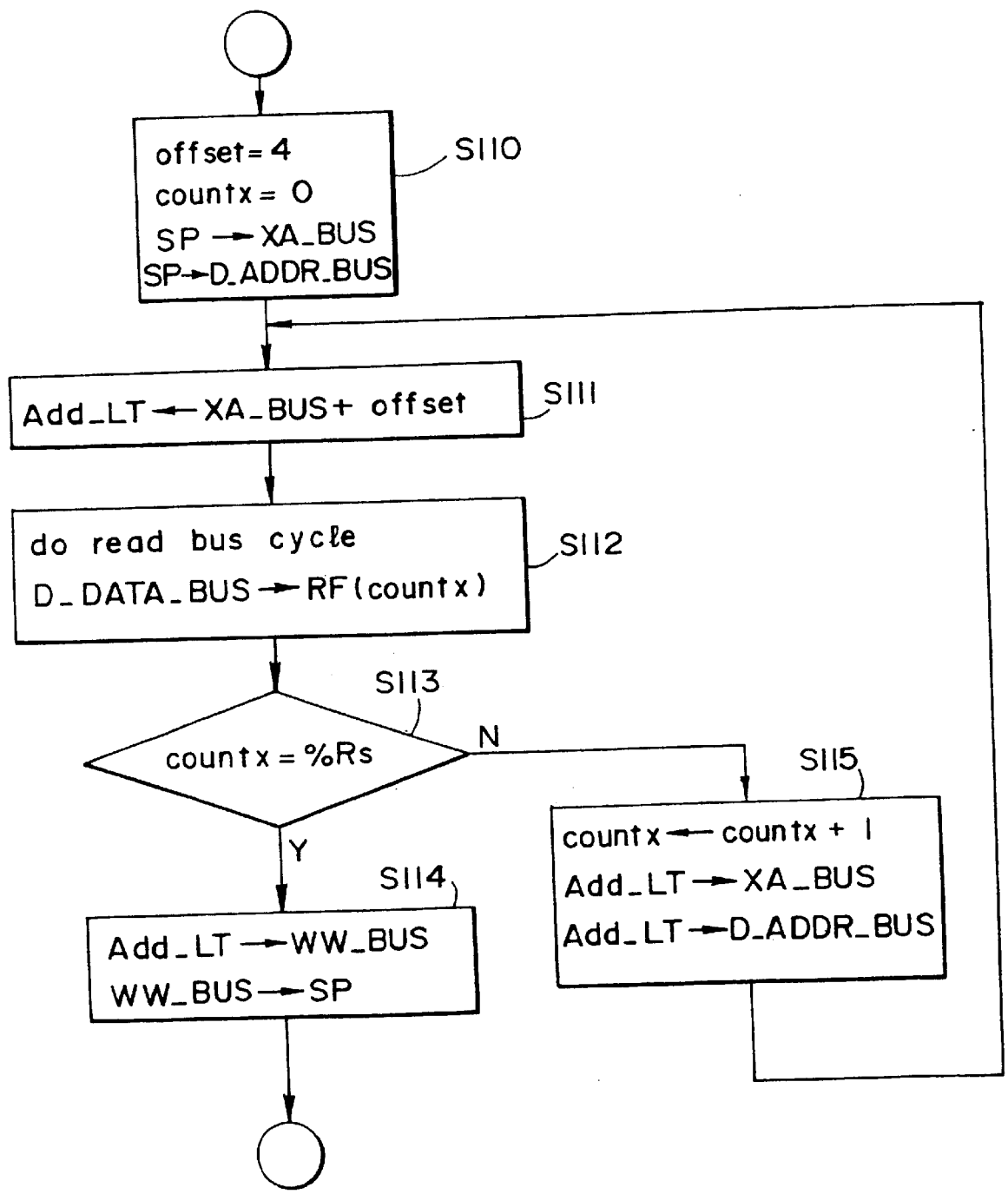
FIG. 22 is a flowchart illustrative of the operation during the popn instruction.

A flowchart illustrating the operation during the popn instruction is shown in FIG. 22.

At the start of execution of the popn instruction, the offset of a offset signal 24 is +4. The counter (countx) 46 is cleared to zero and the stack pointer stored in the SP 14 is output to the XA_BUS 78 and the D_ADDR_BUS 96 (step S110).

The address adder 30 then adds 4 to the value in the XA_BUS 78 and inputs the result to the latch (Add_LT) 32 (step S111).

An external memory read cycle is then performed. The thus-read data is written to the general-purpose registers 11 through the D_DATA_BUS 98. During this time, the counter (countx) 46 is output to the register selection address signal 54 by the control circuit block 45 (step S112).

In a step S113, the counter (countx) 46 is compared with %Rs. If they match, the reading from external memory to registers has been completed and the execution of the popn instruction ends by the writing of the value in the latch (Add_LT) 32 to the SP 14 through the WW_BUS 76 (step S114).

If they do not match, the counter (countx) is incremented by 1, the value in the latch (Add_LT) 32 is output to the XA_BUS 78 and the D_ADDR_BUS 96, and the processing from step S111 onward is repeated (step S115).

Thus the 'pushn %Rs' instruction makes it possible to write data from registers %Rs to R0 to the stack and the 'popn %Rd' instruction makes it possible to return the necessary number of data items from the stack to registers R0 to %Rd. Thus data from registers R3 to R0 can be pushed by the execution of 'pushn %Rs', for example.

A further increase in efficiency is achieved in this case by the addition of a restriction over the way in which registers are used. In other words, the saving and restoration of register is particularly necessary when a program branches to another routine, such as during interrupt processing or when a subroutine is called. It is preferable that each routine called in such a case, such as another interrupt routine or subroutine, uses the registers in sequence from R0. This ensures that the contents of registers can be efficiently saved or restored by using the pushn instruction or popn instruction, without having to include registers from R0 to Rd or Rs that contain data that does not need to be saved. All of the registers in this embodiment have the same functions, and there are no other restrictions on the usage of registers and the instruction, so that this restriction solves the above problem without causing further problems.

Therefore, use of the pushn instruction and popn instruction of this embodiment makes it possible to implement efficient saving of data from registers to the stack in memory and the restoration of data from the stack to registers by a single instruction of either pushn or popn. This minimizes the object code size and the number of program execution steps, and also means that the number of execution cycles can be reduced to a single instruction fetch and the necessary number of data transfers, enabling a minimization of the number of cycles. This makes it possible to increase the speed of interrupt processing routines and subroutines.

Since the structural elements required for this execution are a count means and a simple sequence controller, it is possible to implement a data processing circuit with a small number of gates, so that this invention can be applied to a one-chip microcomputer.

The above description concerned the configuration required for executing the sequential push instruction (pushn) and sequential pop instruction (popn) when a dedicated stack pointer register is used as the SP 14, but it should be obvious to those skilled in the art that the present invention can also be applied to a structure in which any general-purpose register is used as the stack pointer.

Embodiment 2

Figure 23:
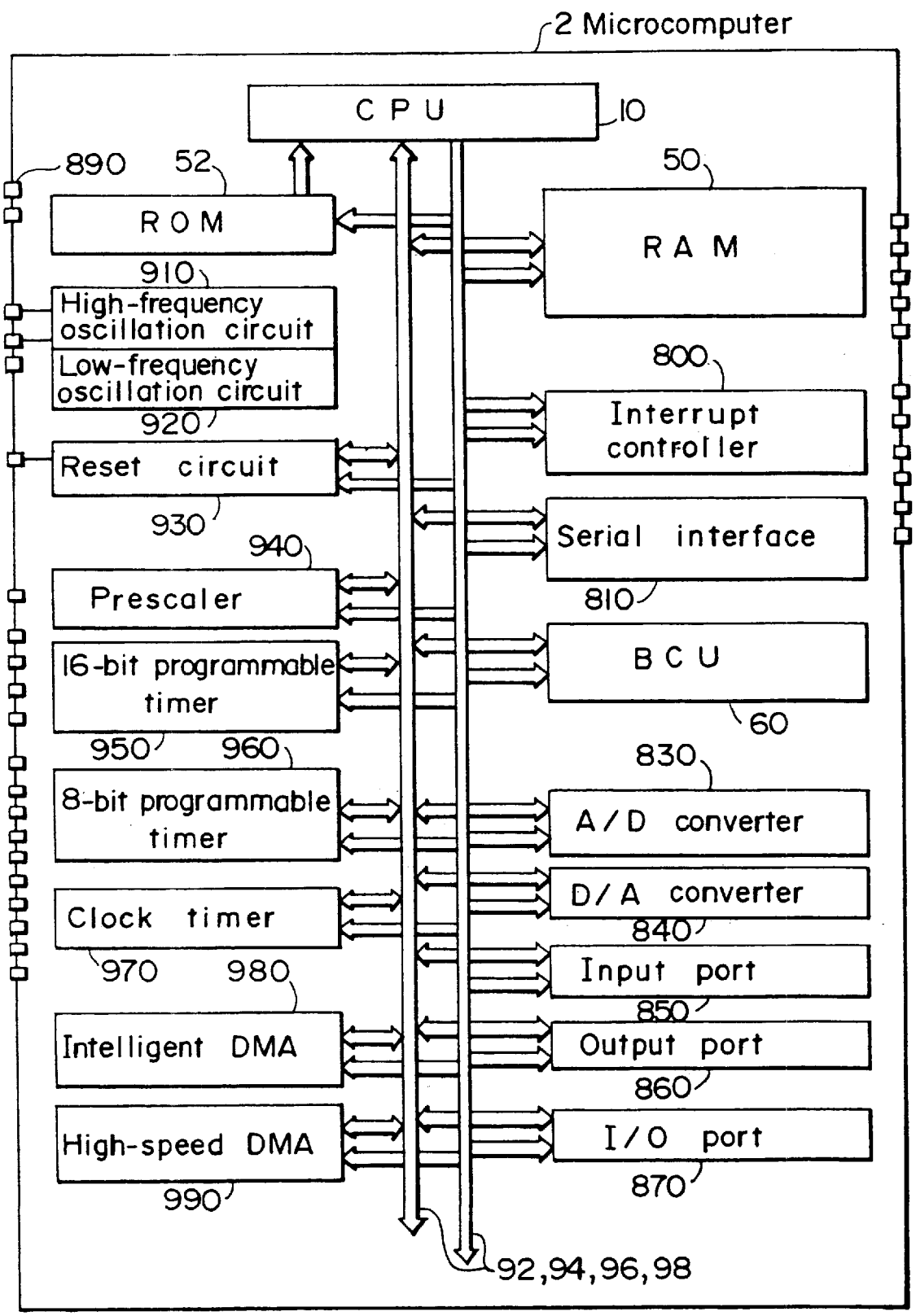
FIG. 23 is a block diagram of the hardware of a microcomputer in accordance with a second embodiment of this invention.

A block diagram of the hardware of a microcomputer in accordance with this embodiment is shown in FIG. 23.

This microcomputer 2 is a 32-bit microcontroller that comprises a CPU 10; ROM 52; RAM 50; a high-frequency oscillation circuit 910; a low-frequency oscillation circuit 920; a reset circuit 930; a prescaler 940; a 15-bit programmable timer 950; a 8-bit programmable timer 960; a clock timer 970; an intelligent DMA 980; a high-speed DMA 990; an interrupt controller 800; a serial interface 810; a bus control unit (BCU) 60; an A/D converter 830; a D/A converter 840: an input port 850; an output port 860; and an I/O port 870; as well as various buses 92, 94, 96, and 98 that are connected to these components and various pins 890.

The CPU 10 has an SP that is a dedicated stack pointer register, and it decodes and executes the dedicated stack pointer instructions as described above. This CPU 10 has the same configuration as that of the previously described Embodiment 1 and it functions as a decoding means and execution means.

The microcomputer of this embodiment can therefore enable efficient coding and execution pf processes that act upon the stack pointer, with short instructions.

The processes of saving and restoring registers can also be coded efficiently, so that interrupt processing and subroutine call/return can be performed rapidly.

The microcomputer of this invention can be applied to peripheral equipment for personal computers, such as printers, or electronic equipment such as portable appliances, for example. Such applications of the invention make it possible to provide inexpensive, but sophisticated, electronic equipment that is facilitated by a data processing circuit that has a fast processing speed and a highly efficient usage of memory.

Note that this invention is not to be taken as being limited to the above described embodiments; it can be embodied in various other ways.

What is claimed is:

1. A data processing circuit comprising:
   a dedicated stack pointer register that is used only for a stack pointer;
   decoding means for decoding object code of a group of dedicated stack pointer instructions which have object code specifying said dedicated stack pointer register as an implicit operand and which relate to processing based on said dedicated stack pointer register, and for outputting a control signal based on said object code; and
   execution means for executing said group of dedicated stack pointer instructions based on said control signal and the contents of said dedicated stack pointer register,
   wherein said group of dedicated stack pointer instructions comprising a load instruction having data for specifying a transfer register within object code, and said load instruction comprising offset data within said object code that is data relating to an offset for specifying the address of a first area in memory;
   said decoding means decodes said load instruction; and
   said execution means performs at least one of a transfer of data from a given first area in memory to a given first register and a transfer of data from said given first register to said given first area, based on a memory address specified by said dedicated stack pointer register and a register address specified by said data for specifying a transfer register, when said load instruction is executed,
   said execution means determining said memory address according to the contents of said dedicated stack pointer register and said offset data.

2. The data processing circuit as defined in claim 1 wherein said offset data comprises immediate offset data and data size information relating to the size of given data in memory; and
   said execution means creates an offset by performing a leftward logical shift on said immediate offset data, based on said immediate offset data and said data size information, and determines said memory address by adding said offset to the contents of said dedicated stack pointer register.

3. A data processing circuit comprising:
   a dedicated stack pointer register that is used only for a stack pointer;
   decoding means for decoding object code of a group of dedicated stack pointer instructions which have object code specifying said dedicated stack pointer register as an implicit operand and which relate to processing based on said dedicated stack pointer register, and for outputting a control signal based on said object code; and
   execution means for executing said group of dedicated stack pointer instructions based on said control signal and the contents of said dedicated stack pointer register,
   wherein said group of dedicated stack pointer instructions comprises a stack pointer move instruction for having move data within the object code thereof and for moving said stack pointer;
   said decoding means decodes said stack pointer move instruction; and
   said execution means modifies the contents of said dedicated stack pointer register based on said move data when said stack pointer move instruction is executed.

4. The data, processing circuit as defined in claim 3,
   wherein said move data comprises immediate data for said stuck pointer move instruction; and
   said instruction execution means performs at least one of a process of adding said immediate data for said stack pointer move instruction and the contents of said dedicated stack pointer register and a process of subtracting said immediate data for said stack pointer move instruction from the contents of said dedicated stack pointer register.

5. The data processing circuit as defined in claim 13, wherein:
   a fixed-length instruction is decoded and execution is based on said fixed-length instruction.

6. A data processing circuit comprising:
   a dedicated stack pointer register that is used only for a stack pointer;
   decoding means for decoding object code of a group of dedicated stack pointer instructions which have object code specifying said dedicated stack pointer register as an implicit operand and which relate to processing based on said dedicated stack pointer register, and for outputting a control signal based on said object code; and
   execution means for executing said group of dedicated stack pointer instructions based on said control signal and the contents of said dedicated stack pointer register,
   wherein:
      said group of dedicated stack pointer instructions comprises a load instruction having data for specifying a transfer register within object code;
      said decoding means decodes said load instruction; and
      said execution means performs at least one of a transfer of data from a given first area in memory to a given first register and a transfer of data from said given first register to said given first area, based on a memory address specified by said dedicated stack pointer register and a register address specified by said data for specifying a transfer register, when said load instruction is executed;
      said group of dedicated stack pointer instructions comprises a stack pointer move instruction for having move data within the object code thereof and for moving said stack pointer;
      said decoding means decodes said stack pointer move instruction; and
      said execution means modifies the contents of said dedicated stack pointer register baked on said move data when said stack pointer move instruction is executed.

7. A data processing circuit comprising:
   a dedicated stack pointer register that is used only for a stack pointer;

decoding means for decoding object code of a group of dedicated stack pointer instructions which have object code specifying said dedicated stack pointer register as an implicit operand and which relate to processing based on said dedicated stack pointer register, and for outputting a control signal based on said object code; and execution means for executing said group of dedicated stack pointer instructions based on said control signal and the contents of said dedicated stack pointer register;

a plurality of registers provided in a contiguous sequence;

wherein said group of dedicated stack pointer instructions comprises at least one of a sequential push instruction and a sequential pop instruction having data for specifying a plurality of registers in the object code thereof;

said decoding means decodes at least one of said sequential push instruction and said sequential pop instruction; and said instruction execution means performs at least one of a process of executing a plurality of sequential pushes of data from said plurality of registers to a stack provided in memory and a process of executing a plurality of sequential pops of data from said stack to said plurality of registers, based on the contents of a memory address specified by said dedicated stack pointer register and said data for specifying a plurality of registers, during the execution of at least one of said sequential push instruction and said sequential pop instruction.

8. The data processing circuit as defined in claim 7, further comprising:

n general-purpose registers specified by register numbers 0 to n–1;

wherein object code of at least one of said sequential push instruction and said sequential pop instruction comprises a final register number to which one of said register numbers is specified, as said data for specifying a plurality of registers; and said execution means performs at least one of a process of executing a plurality of sequential pushes of data into a stack provided in memory from a plurality of registers starting from register 0 to a register specified by said final register number and a process of executing a plurality of sequential pops of data from said stack to a plurality of registers starting from register 0 to a register specified by said final register number, based on the contents of a memory address specified by said dedicated stack pointer register.

9. The data processing circuit as defined in claim 8, wherein said execution means comprises:

write means for writing the contents of a given register that is one of said plurality of registers to a stack provided in memory, based on a memory address specified by said dedicated stack pointer register;

number-of-times-written count means for counting the number-of-times-written of said write means; and comparison means for comparing said number-of-times-written counted by said count means with the value of said data for specifying a plurality of registers;

wherein said write means comprises:

write memory address generation means for adding a first input and a second input by an adder, and for generating a write memory address for specifying a write destination;

first input control means for providing control such that the first input of said adder is the contents of said dedicated stack pointer register at the start of execution of a sequential dedicated instruction, and is a write address generated subsequently by a write address generation means;

second input control means for outputting an offset used during the writing of one word from said stack to the second input of said adder; and write means for writing to said stack the contents of a register specified by subtraction processing which uses said data for specifying a plurality of registers and said number-of-times-written, based on said write memory address;

whereby the writing of the contents of said plurality of registers to said stack and the ending of said writing are controlled based on the comparison result of said comparison means.

10. The data processing circuit as defined in claim 8, wherein said instruction execution means comprises:

read means for reading the contents of a stack provided in memory based on a memory address specified by said dedicated stack pointer register, and storing said contents in a given register of said plurality of registers;

number-of-times-read count means for counting the number-of-times-read of said read means; and comparison means for comparing said number-of-times-read counted by said count means with the value of said data for specifying a plurality of registers;

wherein said read means comprises:

write memory address generation means for adding a first input and a second input by an adder, and for generating a write memory address for specifying a write destination;

first input control means for providing control such that the first input of said adder is the contents of said dedicated stack pointer register at the start of execution of a sequential dedicated instruction, and is a read address generated subsequently by a read address generation means;

second input control means for outputting an offset used during the writing of one word from said stack to the second input of said adder;

read means for reading the contents of said stack based on said read memory address and storing said contents in a register specified based on said number-of-times-written;

whereby the reading of the contents of said stack and the ending of said reading are controlled based on the comparison result of said comparison means.

11. The data processing circuit as defined in claim 7, further comprising:

a program counter register used only for the program counter;

wherein said group of dedicated stack pointer instructions comprises branch instructions that are an instruction for branching to a subroutine and a return instruction from said subroutine;

said decoding means decodes said branch instructions; and said instruction execution means comprises:

means for executing at least one of a process of saving the contents of said program counter register to a given second area of said stack provided in memory and a process of restoring the contents of said second area to said program counter register, based on a memory address specified by said dedicated stack pointer register, during the execution of said branch instructions; and means for updating the contents of said dedicated stack pointer register based on said saving and restoration.

12. A data processing circuit comprising:

a dedicated stack pointer register that is used only for a stack pointer;

decoding means for decoding object code of a group of dedicated stack pointer instructions which have object code specifying said dedicated stack pointer register as an implicit operand and which relate to processing based on said dedicated stack pointer register, and for outputting a control signal based on said object code; and execution means for executing said group of dedicated stack pointer instructions based on said control signal and the contents of said dedicated stack pointer register;

a program counter register used only for the program counter;

wherein said group of dedicated stack pointer instructions comprises branch instructions that are an instruction for branching to a subroutine and a return instruction from said subroutine;

said decoding-means decodes said branch instructions;

said instruction execution means comprises:

means for executing at least one of a process of saving the contents of said program counter register to a given second area of said stack provided in memory and a process of restoring the contents of said second area to said program counter register, based on a memory address specified by said dedicated stack pointer register, during the execution of said branch instruction; and means for updating the contents of said dedicated stack pointer register based on said saving and restoration.

13. A data processing circuit comprising a plurality of registers provided in a contiguous sequence and a stack pointer allocated to one of a plurality of general-purpose register, said data processing circuit further comprising:

means for decoding an object code of an instruction that is at least one of a sequential push instruction and sequential pop instruction that each have data for specifying a plurality of registers within said object code and for outputting a control signal based on said object code; and means for performing at least one of a process of executing a plurality of sequential pushes of data from said plurality of registers to a stack provided in memory and a process of executing a plurality of sequential pops of data from said stack to said plurality of registers, based on said control signal, the contents of a memory address specified by a stack pointer allocated to one of a plurality of general-purpose registers, and said data for specifying a plurality of registers, during the execution of at least one of said sequential push instruction and said sequential pop instruction.

14. The data processing circuit as defined in claim 13, wherein said circuit uses instructions of a reduced instruction set computer.

15. The data processing circuit as defined in claim 13, further comprising:

n general-purpose registers specified by register numbers 0 to n−1;

wherein object code of at least one of said sequential push instruction and said sequential pop instruction comprises a final register number to which one of said register numbers is specified, as said data for specifying a plurality of registers; and said execution means performs at least one of a process of executing a plurality of sequential pushes of data into a stack provided in memory from a plurality of registers starting from register 0 to a register specified by said final register number and a process of executing a plurality of sequential pops of data from said stack to a plurality of registers starting from register 0 to a register specified by said final register number, based on the contents of a memory address specified by said stack pointer allocated to one of a plurality of general-purpose registers.

* * * * *